United States Patent [19]

Scheibli

[11] Patent Number: 4,908,436

[45] Date of Patent: Mar. 13, 1990

[54] FIBRE-REACTIVE AZO DYES CONTAINING VINYLSULFONYL GROUPS AND FURTHER ALIPHATIC FIBRE-REACTIVE RADICALS

[75] Inventor: Peter Scheibli, Bottmingen, Switzerland

[73] Assignee: Ciba-Geigy Corporation, Ardsley, N.Y.

[21] Appl. No.: 921,849

[22] Filed: Oct. 23, 1986

Related U.S. Application Data

[63] Continuation of Ser. No. 833,427, Feb. 24, 1986, abandoned, which is a continuation of Ser. No. 664,142, Oct. 24, 1984, abandoned.

[30] Foreign Application Priority Data

Oct. 26, 1983 [CH] Switzerland ............... 5795/83

[51] Int. Cl.[4] ............... C09B 62/04; C09B 62/507; C09B 62/527; D06P 1/302
[52] U.S. Cl. ............... 534/637; 534/629; 534/632; 534/634; 534/635; 534/636; 534/638; 534/641; 534/642
[58] Field of Search ............... 534/632, 634, 635, 636, 534/637, 638, 641, 642, 617

[56] References Cited

U.S. PATENT DOCUMENTS

| | | | |
|---|---|---|---|
| 3,998,805 | 12/1976 | Koller et al. ............... | 537/641 X |
| 4,622,390 | 11/1986 | Meininger et al. ............... | 534/634 |

FOREIGN PATENT DOCUMENTS

| | | | |
|---|---|---|---|
| 0065732 | 12/1982 | European Pat. Off. ............ | 534/634 |
| 0074928 | 3/1983 | European Pat. Off. ............ | 534/641 |
| 0094055 | 11/1983 | European Pat. Off. ............ | 534/638 |
| 1007752 | 10/1965 | United Kingdom ............... | 534/642 |
| 1576237 | 10/1980 | United Kingdom ............... | 534/638 |

Primary Examiner—Floyd D. Higel
Attorney, Agent, or Firm—Wenderoth, Lind & Ponack

[57] ABSTRACT

A reactive dye of the formula

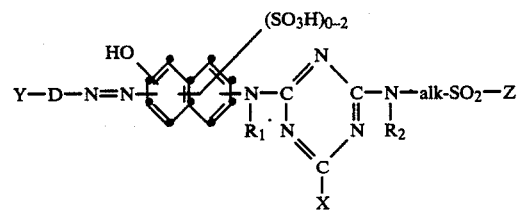

or of the formula

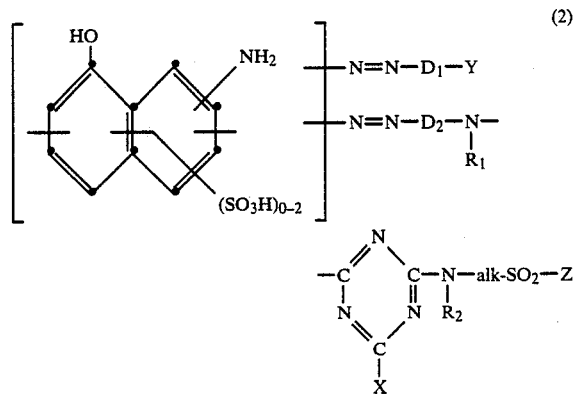

or of the formula

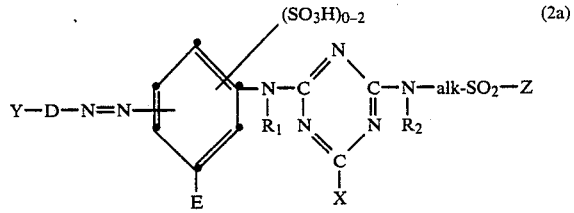

in which D, $D_1$ and $D_2$ are each phenylene or naphthylene unsubstituted or substituted by alkyl having 1 to 4 carbon atoms, alkoxy having 1 to 4 carbon atoms, carboxylic acylamino having 1 to 8 carbon atoms, amino, alkylamino having 1 to 4 carbon atoms, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, alkylsulfonyl having 1 to 4 carbon atoms, trifluoromethyl, nitro, cyano, halogen, carbamoyl, N-alkylcarbamoyl having 1 to 4 carbon atoms in the alkyl radical, sulfamoyl N-alkylsulfamoyl having 1 to 4 carbon atoms, N-(β-hydroxyethyl)-sulfamoyl, N,N-di-(β-hydroxyethyl)-sulfamoyl, N-phenylsulfamoyl, ureido hydroxyl, carboxyl, sulfomethyl, or sulfo, $R_1$ is hydrogen or $C_{1-4}$-alkyl unsubstituted or substituted by halogen, hydroxyl, cyano, $C_{1-4}$-alkoxy, methoxycarbonyl, ethoxycarbonyl, sulfamoyl, sulfato, carboxyl or sulfo, $R_2$ is (1) hydrogen, (2) alkyl unsubstituted or substituted by halogen, hydroxy, cyano, alkoxy, methoxycarbonyl, ethoxycarbonyl, sulfamoyl, sulferto, carboxy or sulfo, (3) cyclohexyl, (4) phenyl unsubstituted or substituted by methyl, ethyl, methoxy, ethoxy, chlorine, bromine, carboxyl, sulfo or sulfomethyl, or (5) a radical of the formula —alk—$SO_2$—Z, E—$NH_2$, —$CH_3$, —NH—CO—$NH_2$, —NH—CO—$CH_3$ or —NH—CO—$CH_2$—OH, wherein alk is $C_{2-6}$-alkylene, Y is —$SO_2$—Z, —$SO_2$—N($R_1$)—Z, —N—($R_1$)—$SO_2$—Z, —N($R_1$)—CO—$(CH_2)_{3-5}SO_2$—Z, —$SO_2$—F, —$SO_2$C-$H_2$—CH=$CH_2$, —N($R_1$)—CO—CBr=$CH_2$, —N($R_1$)—CO—CHBr—$CH_2$Br, —N($R_1$)—CO—CCl=$CH_2$, —N($R_1$)—CO—CHCl—$CH_2$Cl, —N($R_1$)—CO—$CH_2$Cl or —N($R_1$)—CO—CH=$CH_2$, Z is —CH=$CH_2$ or —$CH_2CH_2$—A, A is —$OSO_3H$, —$SSO_3H$, —$OCOCH_3$, —$OPO_3H_2$—Cl, —Br or —F, and X is fluorine, chlorine or hydroxyl.

10 Claims, No Drawings

FIBRE-REACTIVE AZO DYES CONTAINING VINYLSULFONYL GROUPS AND FURTHER ALIPHATIC FIBRE-REACTIVE RADICALS

This application is a continuation application of application Ser. No. 833,427, filed Feb. 24, 1986 (now abandoned), which application is in turn a continuation of application Ser. No. 664,142, filed Oct. 24, 1984 (now abandoned).

The present invention relates to novel reactive dyes, to a process for their preparation, and to their use for dyeing and printing fibre materials.

The practice of dyeing with reactive dyes has in recent years led to increased demands on the quality of the dyeing and the economics of the dyeing process. There consequently continues to be a demand for new reactive dyes with improved properties, in particular application properties.

The demand these days in the dyeing of cotton by the cold pad-batch method is for reactive dyes which are sufficiently substantive at the low dyeing temperature and which also have good wash-off properties. They should also be highly reactive, so that only short batching times are required, and they should in particular produce dyeings having high degrees of fixation. Existing dyes meet these requirements only to an insufficient degree.

It is therefore the object of the present invention to provide new, improved reactive dyes for the cold pad-batch method which have the qualities characterised above to a high degree. The new dyes should be distinguished especially by high degrees of fixation and high fibre-dye bond stabilities, and the unfixed portions on the fibre should moreover be readily washed off. They should also produce dyeings having good all-round fastness properties, for example light and wet fastness properties.

This object is achieved with the novel bireactive dyes defined hereinafter.

The invention accordingly provides reactive dyes of the formula

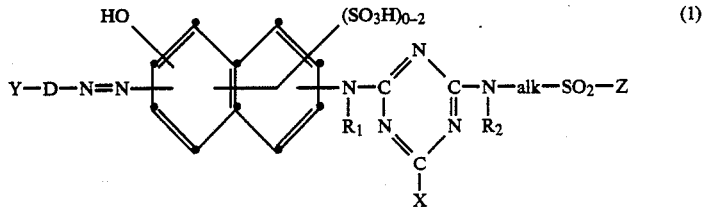

(1)

or of the formula

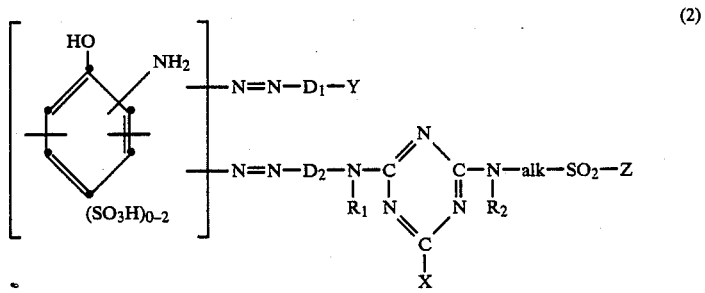

(2)

or of the formula

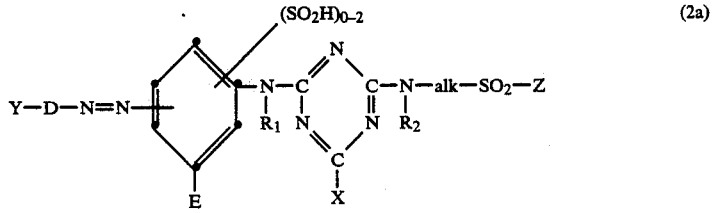

(2a)

in which D, $D_1$ and $D_2$ are each a phenylene or naphthylene radical which can be further substituted, $R_1$ is hydrogen or substituted or unsubstituted $C_{1-4}$-alkyl, $R_2$ is hydrogen, substituted or unsubstituted alkyl or aryl or a radical of the formula —alk—$SO_2$—Z, E —$NH_2$, —$CH_3$, —NH—CO—$NH_2$, —NH—CO—$CH_3$ or —NH—CO—$CH_2$—OH, alk is $C_{2-6}$-alkylene, Y is a —$SO_2$—Z, —$SO_2$—N($R_1$)—Z, —N($R_1$)—$SO_2$—Z,

—N($R_1$)—CO—$(CH_2)_{3-5}$—$SO_2$—Z,

—$SO_2$—F, —$SO_2$—$CH_2$—CH=$CH_2$, —N($R_1$)—CO—CBr=$CH_2$, —N($R_1$)—CO—CHBr—$CH_2$Br, —N($R_1$)—CO—CCl=$CH_2$, —N($R_1$)—CO—CHCl—$CH_2$Cl, —N($R_1$)—CO—$CH_2$Cl or —N($R_1$)—CO—CH=$CH_2$ radical, Z is a —CH=$CH_2$ or —$CH_2CH_2$—A radical, A is an inorganic or organic radical which is detachable under alkaline conditions, and X is fluorine, chlorine or hydroxyl.

The radicals D, $D_1$ and $D_2$ in the formulae (1), (2) and (2a) can be further substituted in conventional manner. Examples of further substituents are alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or butylsulfamoyl, N-(β-hydroxyethyl)-sulfamoyl, N,N-di-(β-hydroxyethyl)-sulfamoyl, N-phenylsulfamoyl, ureido, hydroxyl, carboxyl, sulfomethyl and sulfo. Preferred further substituents are methyl, ethyl, methoxy, ethoxy, acetylamino, benzoylamino, amino, chlorine, bromine, ureido, hydroxyl, carboxyl, sulfomethyl and sulfur. The radicals D, $D_1$ and $D_2$ preferably contain one or more sulfo groups.

The alkyl radical $R_1$ can be straight-chain or branched and can also be further substituted, for example by halogen, hydroxyl, cyano, $C_{1-4}$-alkoxy, carboxyl or sulfo. Examples of $R_1$ are: methyl, ethyl, propyl, isopropyl, butyl, isobutyl, sec.-butyl, tert.-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. $R_1$ is preferably hydrogen, methyl or ethyl.

The radical $R_2$ can be for example an alkyl radical which is straight-chain or branched, which preferably has 1 to 6 carbon atoms and which can be further substituted, for example by halogen, hydroxyl, cyano, alkoxy, carboxyl or sulfo, or an unsubstituted alkyl radical having 7 to 20 carbon atoms, a cyclohexyl radical, or a phenyl radical which can be substituted, for example by methyl, ethyl, methoxy, ethoxy, chlorine, bromine, carboxyl, sulfo or sulfomethyl. Examples of $R_2$ are the following substituents: methyl, ethyl, propyl, isopropyl, butyl, isobutyl, sec.-butyl, tert.-butyl, pentyl, hexyl, nonyl, dodecyl, hexadecyl, pentadecyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-chloropropyl, γ-bromopropyl, sulfomethyl, β-sulfoethyl, aminosulfonylmethyl, β-sulfatoethyl, cyclohexyl, phenyl, o-, m- or p-chlorophenyl, o-, m- or p-methylphenyl, p-ethylphenyl, p-methoxyphenyl, o-, m- or p-sulfophenyl, p-carboxyphenyl and p-sulfomethylphenyl. $R_2$ is preferably hydrogen or a radical of the formula —alk—$SO_2$—Z.

In the event that $R_2$ is a radical of the formula —alk—$SO_2$—Z, the two radicals which are bonded to the nitrogen atom in question can be identical or different. The two radicals of the formula —alk—$SO_2$—Z are preferably identical.

The bridge member alk is a straight-chain or branched alkylene radical having 2 to 6 carbon atoms, for example ethylene, n-propylene, isopropylene, n-butylene, n-pentylene or n-hexylene. alk is preferably an ethylene radical.

The inorganic or organic radical which can be detached under alkaline conditions can be one of the following anionically detachable groups:

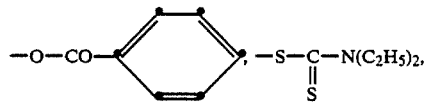

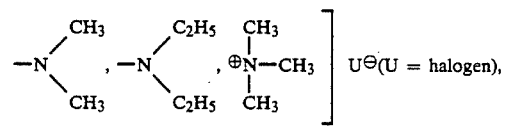

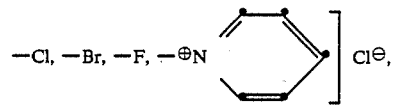

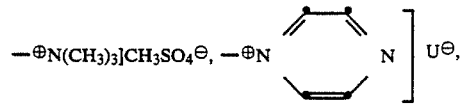

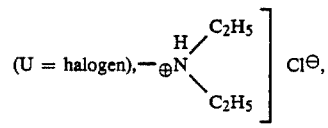

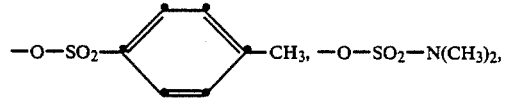

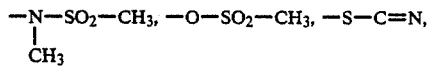

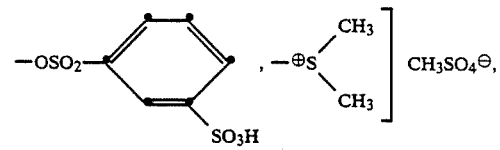

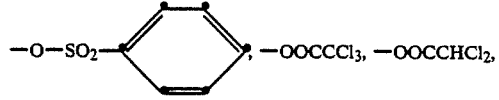

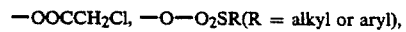

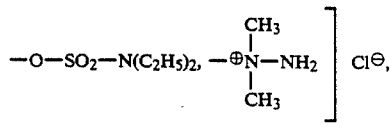

-continued

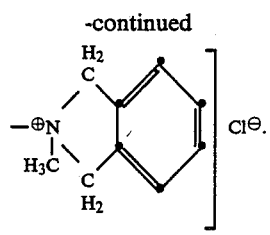

Examples of Y are β-sulfatoethylsulfonyl, vinylsulfonyl, β-sulfatoethylaminosulfonyl, N-methyl-N-β-sulfatoethylaminosulfonyl, N-ethyl-N-β-sulfatoethylaminosulfonyl, β-chloroethylsulfonyl, chloroacetylamino, α,β-dichloropropionylamino, α,β-dibromopropionylamino, α-bromoacryloylamino and 4-(β-chloroethylsulfonyl)-butyrylamino. Y is preferably sulfatoethylsulfonyl or vinylsulfonyl.

Examples of the radical —N(R$_2$)—alk—SO$_2$—Z are β-(β-chloroethylsulfonyl)-ethylamino, γ-(β-chloroethylsulfonyl)-propylamino, bis-[β-(β-chloroethylsulfonyl)-ethyl]-amino, N-methyl-N-β-(β-chloroethylsulfonyl)-ethylamino, N-phenyl-N-β-(β-chloroethylsulfonyl)-ethylamino, β-vinylsulfonyl-ethylamino, bis(β-vinylsulfonyl-ethyl)-amino, N-β-sulfatoethyl-N-β-(β-chloroethylsulfonyl)-ethylamino, β-(β-sulfatoethylsulfonyl)-ethylamino, δ-(β-chloroethylsulfonyl)-butyrylamino and δ-vinylsulfonyl-butytylamino. Preference is given to β-(β-chloroethylsulfonyl)-ethylamino and β-vinylsulfonyl-ethylamino.

The substituent X is in particular chlorine and especially fluorine.

Preference is given to: reactive dyes of the formula

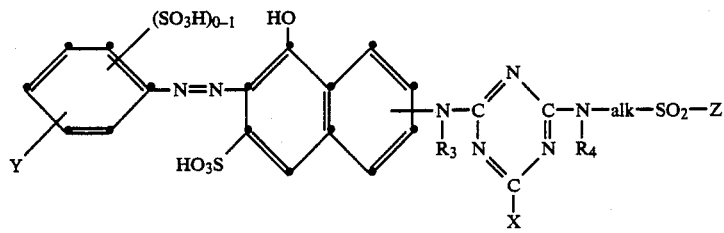

(3)

in which R$_3$ is hydrogen, methyl or ehtyl, R$_4$ is hydrogen or a —alk—SO$_2$—Z radical, alk is C$_{2-6}$-alkylene, Y is a —SO$_2$—Z radical, Z is a —CH=CH$_2$ or —CH$_2$CH$_2$—A radical, A is sulfato, acetoxy, chlorine, phosphato or thiosulfato, and X is fluorine, chlorine or hydroxyl; reactive dyes of the formula

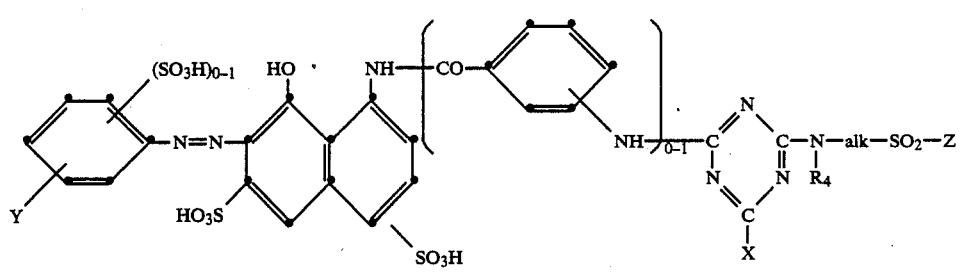

(4)

in which R$_5$ is hydrogen or a —alk—SO$_2$—Z radical, alk is C$_{2-6}$-alkylene, Y is a —SO$_2$—Z radical, Z is a —CH=CH$_2$ or —CH$_2$CH$_2$—A radical, A is sulfato, acetoxy, chlorine, phosphato or thiosulfato, and X is fluorine, chlorine or hydroxyl; reactive dyes of the formula

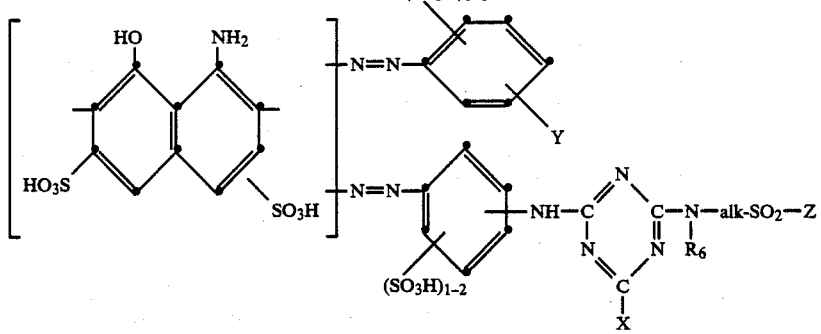

(5)

in which R$_6$ is hydrogen or a —alk—SO$_2$—Z radical, alk is C$_{2-6}$-alkylene, Y is a —SO$_2$—Z radical, Z is a —CH=CH$_2$ or —CH$_2$—CH$_2$—A radical, A is sulfato, acetoxy, chlorine, phosphato or thiosulfato, and X is fluorine, chlorine or hydroxyl; reactive dyes of the formulae

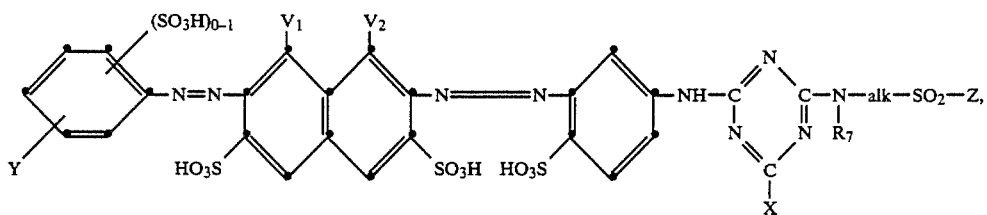
(6)

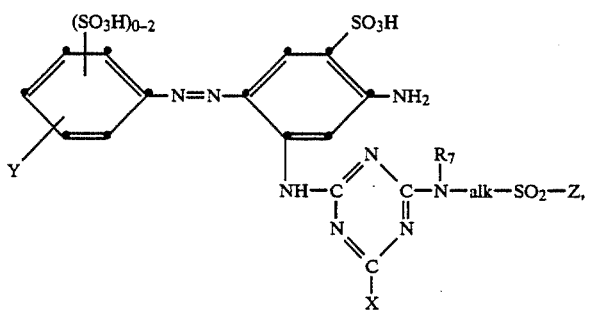
(6a)

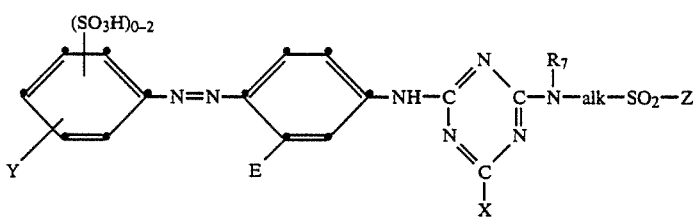
(6b)

in which R₇ is hydrogen or a —alk—SO₂—Z radical, alk is $C_{2-6}$-alkylene, Y is a —NH—CO—CHBr—CH₂—Br, —NH—CO—CBr=CH₂ or —SO₂—Z radical, Z is a —CH=CH₂ or —CH₂—CH₂—A radical, A is sulfato, acetoxy, chlorine, phosphato or thiosulfato, X is fluorine, chlorine or hydroxyl, E is —NH₂, —CH₃, —NH—CO—NH₂ or —NH—CO—CH₃, and one V is is OH the other V is NH₂; the reactive dye of the formula

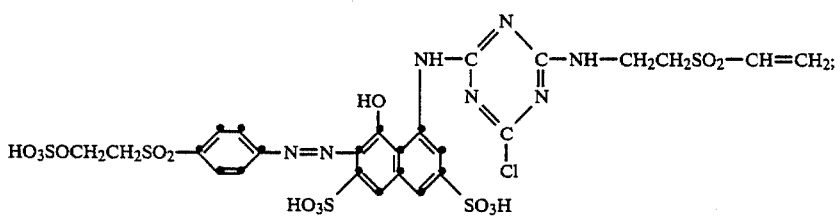
(7)

the reactive dye of the formula

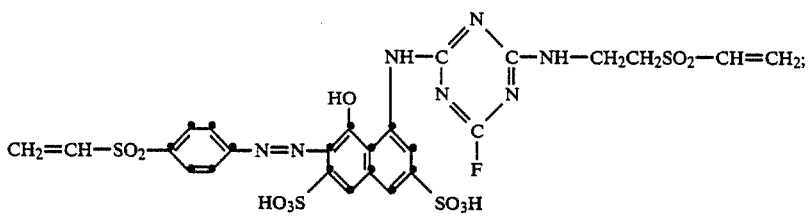
(8)

the reactive dye of the formula

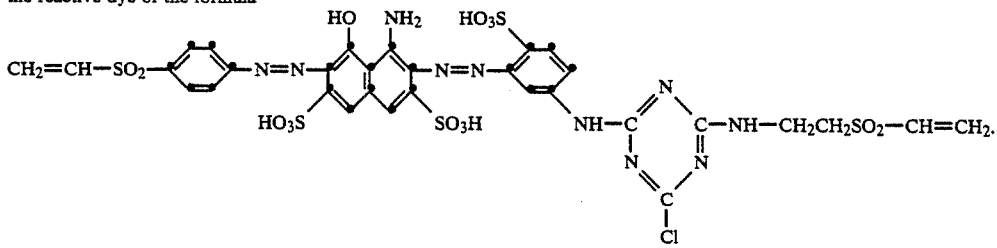
(9)

The process for preparing the reactive dyes of the formulae (1), (2) or (2a) comprises reacting dyes of the formulae

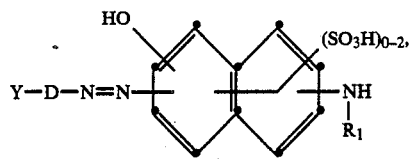 (10)

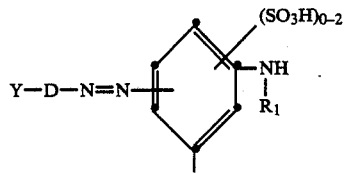 (10a)

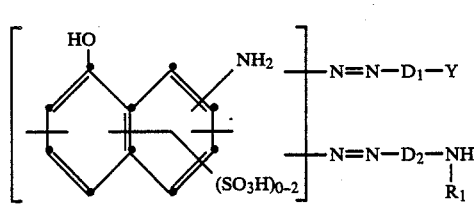 (11)

or their precursors with reactive components to introduce the radicals of the formula

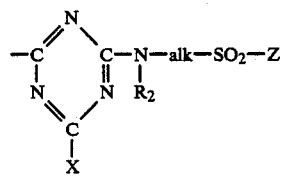 (12)

to give reactive dyes of the formula (1), (2) or (2a), or converting the intermediates obtained into the desired end dyes, and if desired immediately carrying out a further conversion.

The introduction of the radical Y and of the radical of the formula (12) into the dye of the formula (10), (10a) or (11) is effected in a manner known per se, for example through acylation with appropriate carboxylic acid halides or anhydrides and condensation with cyanuric halides and amines of the formula

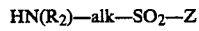 (13).

In the event that Y is a radical which is bonded via a —N($R_1$)— amino group, D or $D_1$ must contain such an amino group. In this case, the diazo component is a diamine or a corresponding amino acetylamino or amino nitro compound in which the acetylamino and nitro groups are converted before the condensation with the acylating agent into the NH$_2$ group by hydrolysis and reduction respectively. If, however, Y is a directly bonded sulfonyl radical, the starting material used is a precursor which already contains this radical, for example 1-amino-4-β-sulfatoethylsulfonylbenzene as diazo component. The reactions required for preparing the end dyes from precursors are couplings or conversions to the reactive radicals.

As the individual process steps given above can be carried out in different orders, there are a number of possible versions for the process. In general the overall reaction is carried out in successive steps, and the order of the elementary reactions between the individual reactants is advantageously arranged in accordance with the special conditions. As a fluorotriazine radical can hydrolyse under certain conditions, an intermediate which contains acetylamino groups must be hydrolysed to split off the acetyl groups before it is condensed with an aminodifluorotriazine or trifluorotriazine. Which reaction is advantageously carried out first in preparing a secondary condensation product from an HN($R_2$)—alk—SO$_2$—Z amine, 2,4,6-trifluoro-s-triazine and diaminobenzenesulfonic acid, that of the trifluorotriazine with the amine or that with the diaminobenzenesulfonic acid, varies from case to case and mainly depends on the solubility of the amino compounds involved and on the basicity of the amino groups to be acylated.

In one embodiment, for example, a diazo component which contains an acylatable —N($R_1$)H group is acylated with an acyl halide, the reaction product is diazotised and coupled onto a coupling component which contains a —N($R_1$)H group, and the resulting monoazo compound is condensed with an aminodihalogenotriazine of the formula

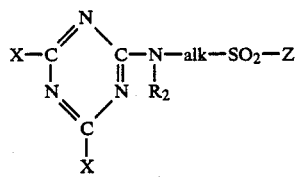 (14)

in which X is fluorine or chlorine or acylated with a trihalogeno-s-triazine, and the product is subsequently condensed with an amine of the formula (13).

Another method comprises first of all preparing a dye which contains a precursor of the reactive radical and then converting this precursor into the reactive radical itself, for example by esterification or an addition reaction. For example, it is possible to prepare a dye in which Y contains an HO—CH$_2$CH$_2$— radical and to react the intermediate before or after the acylation with sulfuric acid, so that the hydroxyl group is converted into the sulfato group; or to use an analogous dye in which Y contains the H$_2$C=CH— vinyl group, and to add the intermediate onto thiosulfuric acid, producing an HO$_3$SS—CH$_2$CH$_2$— radical.

The hydroxyl group in a dye of the formula (10) or (11) or in a suitable precursor is preferably sulfated by reaction at 0° C. to moderately elevated temperatures with concentrated sulfuric acid. This sulfation can also be effected by reacting the hydroxy compound at 10° to 80° C. with 2 equivalents of chlorosulfonic acid per hydroxyl group in a polar organic solvent, for example N-methylpyrrolidone. The sulfation is preferably effected by adding the compound in question to sulfuric acid monohydrate at temperatures between 5° and 15° C. In the subsequent sulfation a fluorine atom on the triazine ring can be replaced by a hydroxyl group.

The introduction into a compound of the formula (1) or an intermediate of an inorganic or organic radical X which is detachable under alkaline conditions, other than a halogen atom or the sulfato group, for example a thiosulfato or phosphato group, is effected in a manner known per se.

Moreover, the synthesis can be followed by elimination reactions. For example, reactive dyes of the formula (1) which contain sulfatoethylsulfonyl radicals can be treated with agents which eliminate hydrogen halide, such as sodium hydroxide, to convert the sulfatoethylsulfonyl radicals into vinylsulfonyl radicals. Or, in the event that in a reactive dye of the formula (1) the radical Y is an α,β-dibromopropionylamino radical, the α,β-dibromopropionyl group, by treatment with agents which eliminate hydrogen halide, can be converted into the α-bromoacryloyl group, if desired at the same time as the abovementioned elimination of sulfuric acid from a sulfatoethylsulfonyl radical.

The above-described way of synthesis via an intermediate of the reactive radical is in many cases uniform and complete.

The dyes of the formulae (10) or (11) or the dye precursors are acylated with acyl halides or halogenotriazines in manners known per se, preferably in aqueous solutions or suspensions and in the presence of alkaline, acid-binding agents, for example aqueous alkali metal hydroxides, carbonates or bicarbonates.

Reactive dyes of the formula (1) in which Y is a directly bonded sulfonyl radical can be prepared by starting from dyes of the formulae (10) or (11) which already contain a Y group, and acylating the —N(R$_1$)H group with a halogenotriazine, or using appropriate precursors, for example a diazo component of the formula

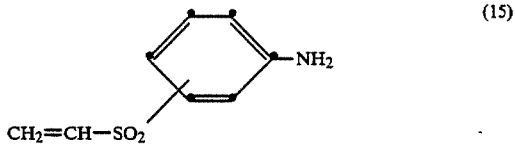

(15)

and coupling it onto a coupling component which contains a —N(R$_1$)H group, and acylating the —N(R$_1$)H group with a halogenotriazine before or after the coupling.

If the synthesised reactive dyes contain groups capable of metal complex formation, the reactive dyes can also be subsequently metallised.

The most important versions of the process are described in the illustrative embodiments.

There now follow specific examples of starting materials which can be used for preparing the reactive dyes of the formula (1).

DIAZO COMPONENTS 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenylene), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- or 4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyl oxide, 4,4'-diaminodiphenylurea-2,2'-disulfonic acid, 4,4'-diaminodiphenyloxyethan-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid and 1-amino-4-methoxy-5-aminomethylbenzene-6-sulfonic acid.

If the diazo component to be used is not a diamine but an aminoacetylamino compound from which the acetyl is subsequently to be reeliminated by hydrolysis, as mentioned above in the description of the process variants, the monoacetyl compounds of the abovementioned diazo compounds are possible, examples being 1-acetylamino-3-aminobenzene-4-sulfonic acid and 1-acetylamino-4-aminobenzene-3-sulfonic acid. Examples of diazo components which already contain a Y group are 1-amino-2-, -3- or -4-β-sulfoethylsulfonylbenzene, 1-amino-3-β-phosphatoethylsulfonylbenzene, 1-amino-4-methyl-3-β-sulfatoethylsulfonylbenzene, 1-amino-3-β-chloroethylsulfonylbenzene, 1-amino-4-methoxy-3-β-sulfatoethylsulfonylbenzene, 1-amino-4-β-sulfatoethylsulfonylbenzene-2-sulfonic acid, 1-amino-5-β-sulfatoethylsulfonylbenzene-2-sulfonic acid, 1-amino-5-β-sulfatoethylsulfonylbenzene-2,4-disulfonic acid, 1-amino-4-β-sulfatoethylsulfonylnaphthalene, 1-amino-2,5-dimethoxy-4-β-sulfatoethylsulfonylbenzene, 1-amino-4-β-sulfatoethylsulfonylbenzene-2-carboxylic acid, 1-amino-5-β-sulfatoethylsulfonylbenzene-2-carboxylic acid, 1-amino-2-methoxy-4-β-sulfatoethylsulfonylbenzene, 1-amino-2-chloro-4-β-sulfatoethylsulfonylbenzene, 1-amino-2-methoxy-5-β-sulfatoethylsulfonylbenzene, 2-amino-8-β-sulfatoethylsulfonylnaphthalene, 2-amino-8-β-sulfatoethylsulfonylnaphthalene-6-sulfonic acid, 1-amino-2,5-dimethoxy-4-vinylsulfonylbenzene, 1-amino-2-methoxy-5-methyl-4-β-sulfatoethylsulfonylbenzene, 1-amino-2,5-diethoxy-4-β-sulfatoethylsulfonylbenzene, 1-amino-2-bromo-4-β-sulfatoethylsulfonylbenzene, 1-amino-2-bromo-4-vinylsulfonylbenzene, 1-amino-5-vinylsulfonylbenzene-2,4-disulfonic acid, 1-amino-5-β-phosphatoethylsulfonylbenzene-2,4-disulfonic acid, 1-amino-5-β-chloroethylsulfonylbenzene-2,4-disulfonic acid, 2-amino-8-β-phosphatoethylsulfonylnaphthalene-6-sulfonic acid, 2-amino-8-vinylsulfonylnaphthalene-6-sulfonic acid, 1-amino-2-methoxy-5-methyl-4-β-chloroethylsulfonylbenzene, 2-amino-4-β-sulfatoethylsulfonylphenol, 1-amino-3- or -4-vinylsulfonylbenzene, 1-amino-2-hydroxy-4-β-sulfatoethylsulfonylbenzene, 1-amino-5-vinylsulfonylbenzene-2-sulfonic acid, 3-(N-methyl-β-sulfatoethylsulfonylamino)-1-aminobenzene, 3-(N-ethyl-β-sulfatoethylsulfonylamino)-1-aminobenzene and 3-β-sulfatoethylsulfonylamino-1-aminobenzene.

COUPLING COMPONENTS

1-Amino-8-hydroxynaphthalene-3,6-disulfonic acid, 1-amino-8-hydroxynaphthalene-4,6-disulfonic acid, 1- amino-8-hydroxynaphthalene-4-sulfonic acid, 2-amino-5-hydroxynaphthalene-7-sulfonic acid, 2-methylamino-5-hydroxynaphthalene-7-sulfonic acid, 2-ethylamino-5-hydroxynaphthalene-7-sulfonic acid, 2-acetylamino-5-hydroxynaphthalene-7-sulfonic acid, 2-(N-acetyl-N-methylamino)-5-hydroxynaphthalene-7-sulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or 4,6-disulfonic acid, 2-(4'-amino-3'-sulfophenylamino)-5-hydroxynaphthalene-7-sulfonic acid, 1,3-diaminobenzene-4-sulfonic acid, 1-amino-3-methylbenzene, 1-amino-3-carbamoyl-aminobenzene, 1-amino-3-acetylaminobenzene and 1-amino-3-hydroxyacetylaminobenzene.

REACTIVE COMPONENTS

The halides of the abovementioned Y radicals, for example α,β-dibromopropionyl chloride, α,β-dichloropropionyl chloride, α-bromoacryloyl chloride or α-chloroacryloyl chloride, if desired also similarly reacting halogenated anhydrides, such as α,β-dichloropropionic anhydride, 4-(β-chloroethylsulfonyl)-butyryl chloride, 4-vinylsulfonylbutyryl chloride and the like, 2,4,6-trifluoro-s-triazine (cyanuric fluoride) and 2,4,6-trichloro-s-triazine (cyanuric chloride), as well as the primary condensation products of 2,4,6-trifluoro-s-triazine or 2,4,6-trichloro-s-triazine with the amines of the formula (13) mentioned hereinafter.

AMINES OF THE FORMULA (13)

β-(β-Chloroethylsulfonyl)-ethylamine, β-(β-bromoethylsulfonyl)-ethylamine, β-vinylsulfonyl-ethylamine, γ-(β-chloroethylsulfonyl)-propylamine, α-(β-chloroethylsulfonyl)-isopropylamine, δ-(β-chloroethylsulfonyl)-butylamine, β-(β-chloroethylsulfonyl)-isobutylamine, ε-(β-chloroethylsulfonyl)-pentylamine, β-(β-chloroethylsulfonyl)-hexylamine, N-methyl-N-β-(β-chloroethylsulfonyl)-ethylamine, N-ethyl-N-β-(β-chloroethylsulfonyl)-ethylamine, N-propyl-N-β-(β-chloroethylsulfonyl)-ethylamine, N-butyl-N-β-(β-chloroethylsulfonyl)-ethylamine, N-pentyl-N-β-(β-chloroethylsulfonyl)-ethylamine, N-hexyl-N-β-(β-chloroethylsulfonyl)-ethylamine, N-nonyl-N-β-(β-chloroethylsulfonyl)-ethylamine, N-dodecyl-N-β-(β-chloroethylsulfonyl)-ethylamine, N-hexadecyl-N-β-(β-chloroethyl)-ethylamine, N-octadecyl-N-β-(β-chloroethylsulfonyl)-ethylamine, N-carboxymethyl-N-β-(β-bromoethylsulfonyl)-ethylamine, N-sulfatomethyl-N-β-(β-chloroethylsulfonyl)-ethylamine, N-β-carboxyethyl-N-γ-(β-chloroethylsulfonyl)-propylamine, N-β-sulfatoethyl-N-γ-(β-chloroethylsulfonyl)-propylamine, N-β-sulfatoethyl-N-δ-(β-chloroethylsulfonyl)-butylamine, N-β-ethoxyethyl-N-δ-(β-chloroethylsulfonyl)-butylamine, N-γ-chloropropyl-N-β-(β-chloroethylsulfonyl)-ethylamine, N-phenyl-N-β-(β-chloroethylsulfonyl)-ethylamine, N-p-chlorophenyl-N-β-(β-chloroethylsulfonyl)-ethylamine, N-o-methylphenyl-N-β(β-chloroethylsulfonyl)-ethylamine, N-p-methoxyphenyl-N-β(β-chloroethylsulfonyl)-ethylamine, N-m-sulfophenyl-N-β(β-chloroethylsulfonyl)-ethylamine, N-p-sulfophenyl-N-β-(β-chloroethylsulfonyl)-ethylamine, bis-[β-(β-chloroethylsulfonyl)-ethyl]-amine, bis-[β-(β-bromoethylsulfonyl)-ethyl]-amine, bis-[γ-(β-chloroethylsulfonyl)-propyl]-amine, bis-[δ-(β-chloroethylsulfonyl)-butyl]-amine, and bis-(β-vinylsulfonylethyl)-amine.

Preference is given to amines of low molecular weight, such as β-(β-chloroethylsulfonyl)-ethylamine and its N-methyl derivative. Bis-[β-(β-chloroethylsulfonyl)-ethyl]-amine is particularly preferred.

Examples of possible dyes of the formulae (10) and (11) are dyes of the following structural groups:

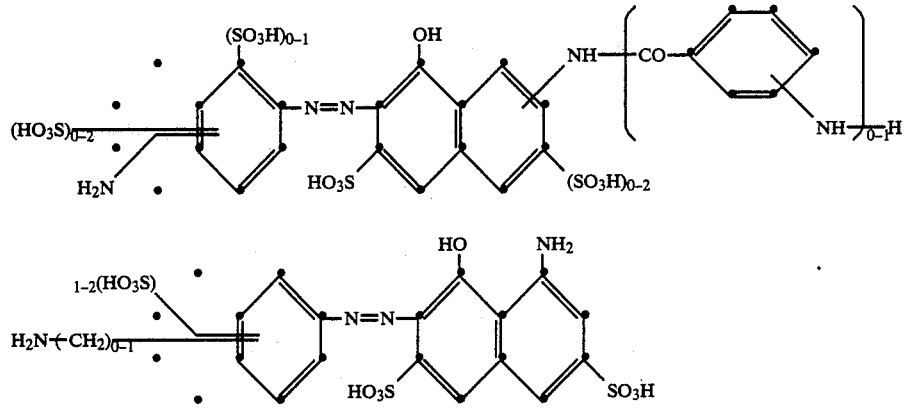

metal complexes of dyes of the formulae

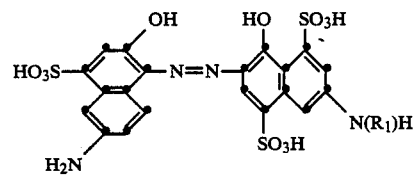

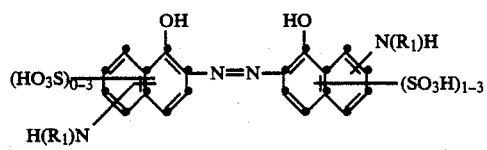

The metal atom is preferably Cu (1:1 complex) or Cr and Co (1:2 complex). Cr- and Co-complexes can contain one or two molecules of the azo compound of the abovementioned formula, i.e. they can be symmetrical or include any other ligand group and be asymmetrical.

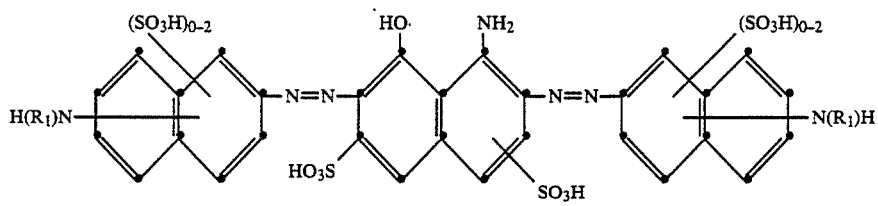
The fused rings indicated by the broken lines stand for alternatively possible naphthalene systems.
The dyes of the abovementioned formulae can be further substituted in the alkyl or aryl radicals, in particular by the substituents mentioned in the explanation of the formula (1).
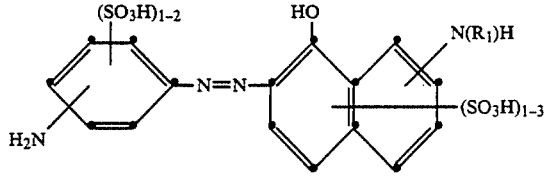
and the metal complex azo dyes of the formulae
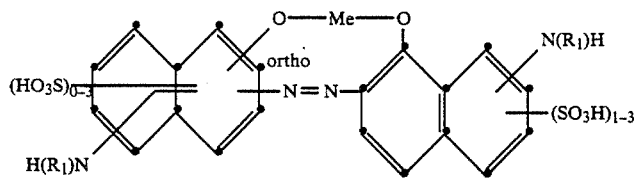
in which Me is Cu, Cr or Co,
and
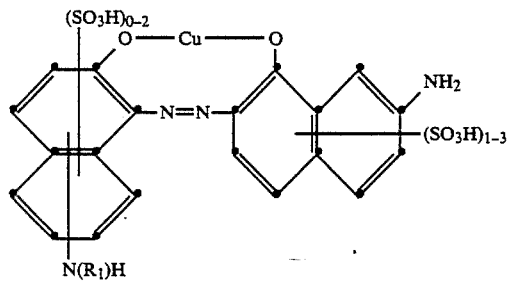
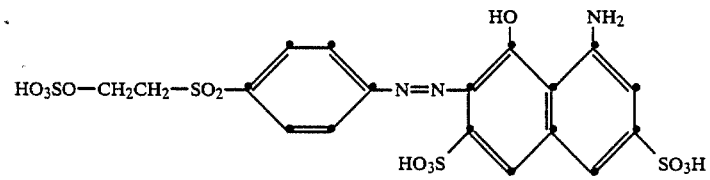
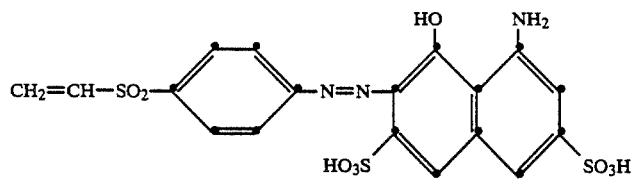
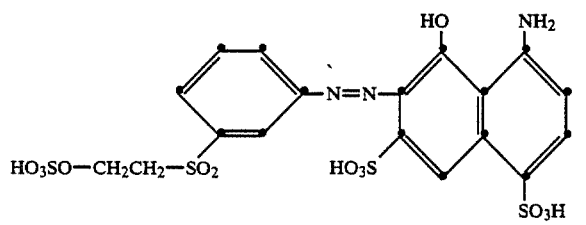

-continued

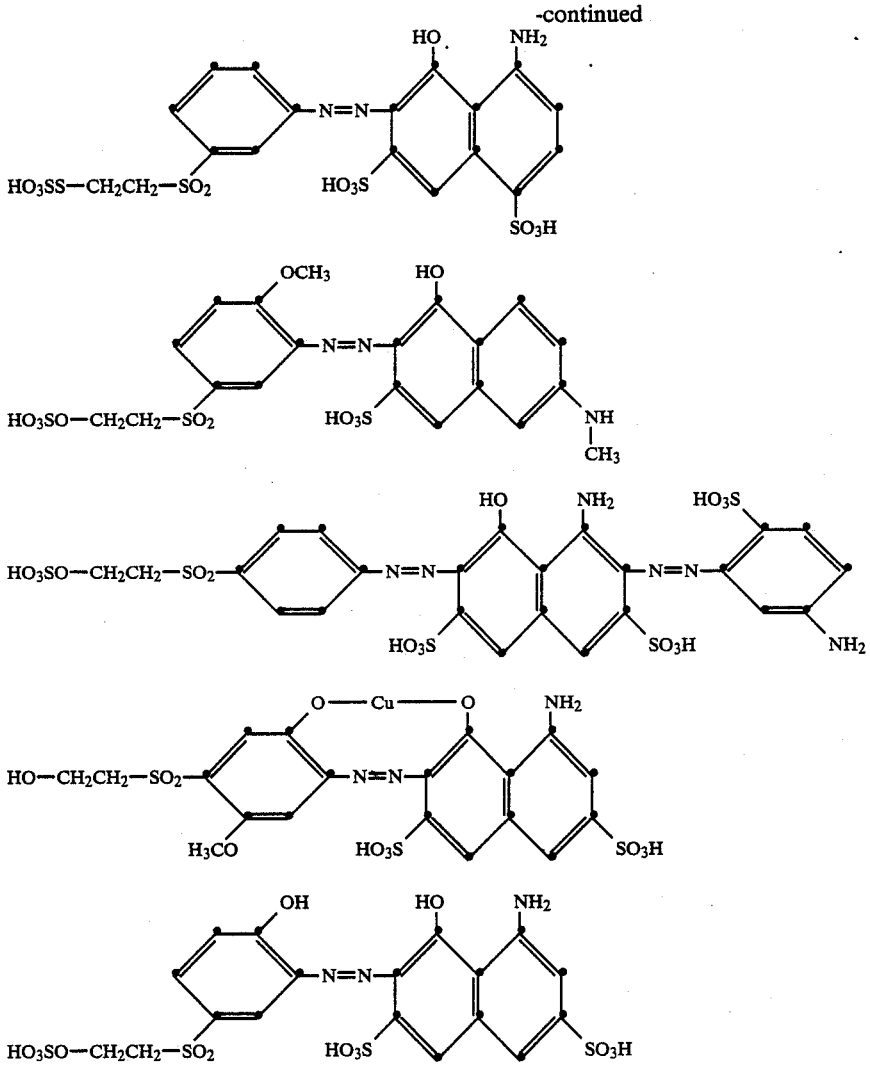

The diazotisation of the diazo components and of the intermediates containing a diazotisable amino group is generally effected through the action of nitrous acid in aqueous mineral acid solutions at low temperatures. The coupling onto the coupling component is effected at strongly acid, neutral or weakly alkaline pH.

The condensation of the reactive components with the diazo components and coupling components and with the amines or with acylatable monoazo or disazo intermediates or with the amino-containing dyes is preferably effected in aqueous solutions or suspensions, at low temperatures and at weakly acid, neutral or weakly alkaline pH. The hydrogen halide set free in the course of the condensation is advantageously continuously neutralised by adding aqueous alkali metal hydroxides, carbonates or bicarbonates.

The reactive dyes of the formula (1) are fibre-reactive. Fibre-reactive compounds are to be understood as meaning compounds which are capable of reacting with the hydroxyl groups of the cellulose or with the amino groups of natural or synthetic polyamides to form covalent chemical bonds.

The reactive dyes of the formula (1) are suitable for dyeing and printing a very wide variety of different materials, such as silk, leather, wool, nylon fibres and polyurethanes, and in particular cellulose-containing fibre materials of any kind. Examples of these fibre materials are natural cellulose fibres, such as cotton, linen and hemp, pulp and regenerated cellulose. The reactive dyes of the formula (1) are also suitable for dyeing or printing hydroxyl-containing fibres present in blend fabrics, for example blends of cotton with polyester fibres or nylon fibres.

The dyes according to the invention can be applied to the fibre material, and be fixed on the fibre, by various methods, in particular in the form of aqueous dye solutions and print pastes. They are suitable not only for the exhaust method but also for dyeing by the pad-dyeing method, whereby the cloth is impregnated with aqueous dye solutions which can contain salt, and the dyes are fixed after an alkali treatment or in the presence of alkali, if desired under heat. They are particularly suitable for the so-called cold pad-batch method, whereby the dye is applied on the pad-mangle together with the alkali and is then fixed by leaving the padded cloth to stand at room temperature for several hours. After the dye has been fixed the dyeings or prints are thoroughly rinsed with cold and hot water in the presence or absence of an agent which acts like a dispersant and promotes the diffusion of the unfixed portions.

The reactive dyes of the formula (1) are distinguished by high reactivity and good fixing properties. For this reason they can be used for exhaust dyeing at low dyeing temperatures and only short steaming times are necessary in the pad-steam process. The degrees of fixation are high, and the unfixed portions are readily washed off, the difference between the degree of exhaustion and degree of fixation being remarkably small, i.e. the hydrolysis loss is very small. The reactive dyes of the formula (1) are also suitable for printing, in particular on cotton, but also for printing nitrogen-containing fibres, for example wool, silk or wool-containing blend fabrics.

The dyeings and prints prepared with the dyes according to the invention on cellulose fibre materials have a high tinctorial strength and a high fibre-dye bond stability, both in the acid range and the alkaline range, plus a good light fastness and very good wet fastness properties, such as wash, water, seawater, cross-dyeing and perspiration fastness properties, and good pleating fastness, hot-press fastness and rub fastness.

The following examples serve to illustrate the invention. The temperatures are given in degrees centigrade, and the parts and percentages are by weight unless otherwise stated. Parts by weight relate to parts by volume as the kilogram relates to the liter.

The preparation of the monoazo or disazo intermediate compounds has not been described in all cases in the following illustrative embodiments, but it is readily apparent from the general description.

EXAMPLE 1

31.9 parts of 1-amino-8-hydroxynaphthalene-3,6-disulfonic acid are dissolved in 100 parts of water under neutral conditions. This solution is added dropwise in the course of 10 minutes to a mixture of 200 parts of ice and water, 18.5 parts of 2,4,6-trichloro-1,3,5-triazine and 10 parts of 37% hydrochloric acid. The reaction mixture is held at pH 1.5 until the condensation has ended by continuously adding 2N sodium hydroxide solution. After the addition of 22.9 parts of β-(β-chloroethylsulfonyl)-ethylamine hydrochloride, the temperature of the reaction mixture is gradually raised from 5° C. to 20° C., while the reaction mixture is initially held at pH 6.5 and then at pH 8.0 by the continuous addition of 2N sodium hydroxide solution. After the condensation and elimination reaction has ended, this dye intermediate is coupled at 0° to 10° C. and pH 6.0 with 28.1 parts of diazotised 1-amino-4-(β-sulfatoethylsulfonyl)-benzene. After the coupling reaction at pH 6.5 has ended, the reaction mixture is clarified and the resulting reactive dye of the formula

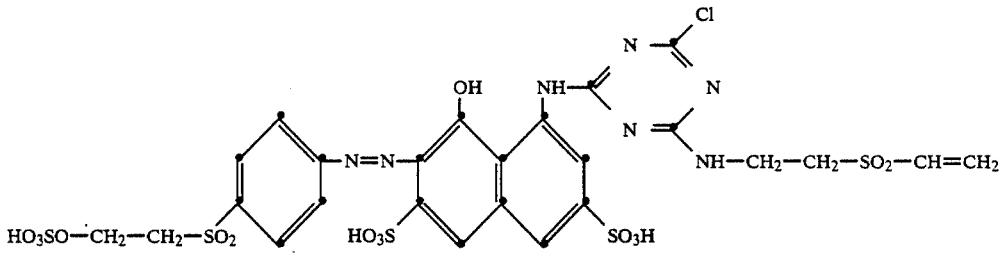

is salted out by sprinkling in potassium chloride, is filtered off and is dried in vacuo. It dyes cotton in red shades.

Other useful reactive dyes which dye cotton in the hues given in column 4 of Table 1 are obtained by following Example 1 and reacting 1-amino-8-hydroxynaphthalene-3,6-disulfonic acid first with 2,4,6-trichloro-1,3,5-triazine and then with the amino compound indicated in column 2 and coupling the diazotised diazo component indicated in column 3 onto the coupling component thus obtained.

If desired the isolation of the dye at pH 6.5–7.5 can be preceded by an elimination reaction in which the reaction solution is held at 15° to 25° C. at pH 9.0–10.0 by the continuous addition of 2N sodium hydroxide solution until complete conversion is indicated by chromatography.

TABLE 1

| No. | Amino compound | Diazo component | Hue on cotton |
|---|---|---|---|
| 1 | β-(β-Chloroethylsulfonyl)-ethylamine hydrochloride | 1-amino-3-(β-sulfatoethylsulfonyl)-benzene | yellowish red |
| 2 | β-(β-Chloroethylsulfonyl)-ethylamine hydrochloride | 1-amino-2-(β-sulfatoethylsulfonyl)-benzene | red |
| 3 | β-(β-Chloroethylsulfonyl)-ethylamine hydrochloride | 1-amino-4-allylsulfonyl-benzene | red |
| 4 | β-(β-Chloroethylsulfonyl)-ethylamine hydrochloride | 1-amino5-(2,3-dibromo-propionylamino)-benzene-2-sulfonic acid | yellowish red |
| 5 | β-(β-Chloroethylsulfonyl)-ethylamine hydrochloride | 1-amino-5-(α-bromoacryloyl-amino)-benzene-2-sulfonic acid | yellowish red |
| 6 | β-(β-Chloroethylsulfonyl)-ethylamine hydrochloride | 1-amino-5-(2,3-dichloro-propionylamino)-benzene-2-sulfonic acid | yellowish red |
| 7 | β-(β-Chloroethylsulfonyl)-ethylamine hydrochloride | 1-amino-5-chloroacetylamino-benzene-2-sulfonic acid | yellowish red |
| 8 | Bis-(β-(β-chloroethylsulfonyl)-ethyl)-amine hydrochloric acid | 1-amino-4-(β-sulfatoethylsulfonyl)-benzene | red |
| 9 | Bis-(β-(β-chloroethyl- | 1-amino-2-(β-sulfatoethyl- | red |

TABLE 1-continued

| No. | Amino compound | Diazo component | Hue on cotton |
|---|---|---|---|
| | sulfonyl)-ethyl)-amine hydrochloric acid | sulfonyl)-benzene sulfonyl)-benzene | |
| 10 | Bis-(β-(β-chloroethyl-sulfonyl)-ethyl)-amine hydrochloric acid | 1-amino-4-allysulfonyl-benzene | red |
| 11 | Bis-(β-(β-chloroethyl-sulfonyl)-ethyl)-amine hydrochloric acid | 1-amino-5-(2,3-dibromo-propionylamino)-benzene-2-sulfonic acid | yellowish red |
| 12 | Bis-(β-(β-chloroethyl-sulfonyl)-ethyl)-amine hydrochloric acid | 1-amino-5-(2,3-dichloro-propionylamino)-benzene-2-sulfonic acid | yellowish red |
| 13 | Bis-(β-(β-chloroethylsulfo-nyl)-ethyl)-amine hydro-chloride acid | 1-amino-5-chloroacetyl-amino-benzene-2-sulfonic | yellowish red |
| 14 | Bis-(β-(β-chloroethylsulfo-nyl)-ethyl)-amine hydro-chloride acid | 1-amino-3-(β-sulfatoethyl-sulfonyl)-benzene | yellowish red |
| 15 | 3-(β-Chloroethylsulfonyl)-propylamine hydrochloride | 1-amino-4-(β-sulfatoethyl-sulfonyl)-benzene | red |
| 16 | 3-(β-Chloroethylsulfonyl)-propylamine hydrochloride | 1-amino-3-(β-sulfatoethyl-sulfonyl)-benzene | yellowish red |
| 17 | 3-(β-Chloroethylsulfonyl)-propylamine hydrochloride | 1-amino-2-(β-sulfatoethyl-sulfonyl)-benzene | red |
| 18 | 3-(β-Chloroethylsulfonyl)-propylamine hydrochloride | 1-amino-5-(2,3-dibromo-propionylamino)-benzene-2-sulfonic acid | yellowish red |
| 19 | 4-(β-Chloroethylsulfonyl)-butylamine hydrochloride | 1-amino-4-(β-sulfatoethyl-sulfonyl)-benzene | red |
| 20 | 4-(β-Chloroethylsulfonyl)-butylamine hydrochloride | 1-amino-3-(β-sulfatoethyl-sulfonyl)-benzene | yellowish red |
| 21 | 4-(β-Chloroethylsulfonyl)-butylamine hydrochloride | 1-amino-2-(β-sulfatoethyl-sulfonyl)-benzene | red |
| 22 | 4-(β-Chloroethylsulfonyl)-butylamine hydrochloride | 1-amino-5-(2,3-dibromo-propionylamino)-benzene-2-sulfonic acid | yellowish red |
| 23 | β-(β-Chloroethylsulfonyl)-ethylamine hydrochloride | 1-amino-5-(4-(β-chloroethyl-sulfonyl)-butyrylamino)-benzene-2-sulfonic acid | yellowish |
| 24 | Bis-(β-(β-chloroethylsulfo-nyl)-ethyl)-amine hydro-chloride | 1-amino-5-(4-β-chloroethyl-sulfonyl)-butyrylamino-benzene-2-sulfonic acid | yellowish red |

EXAMPLE 2

31.9 parts of 1-amino-8-hydroxynaphthalene-3,6-disulfonic acid are dissolved in 100 parts of water under neutral conditions. This solution is added dropwise in the course of 10 minutes to a mixture of 200 parts of ice and water, 18.5 parts of 2,4,6-trichloro-1,3,5-triazine and 10 parts of 37% hydrochloric acid. The reaction mixture is held at pH 1.5 until the condensation has ended by continuously adding 2N sodium hydroxide solution.

This intermediate is coupled at 0° to 10° C. and pH 1.0 with 28.1 parts of diazotised 1-amino-4-(β-sulfatoethyl-sulfonyl)-benzene. After the coupling reaction at pH 6.5 has ended, the reaction solution is brought to pH 8.0.

After the addition of 22.9 parts of β-(β-chloroethyl-sulfonyl)-ethylamine hydrochloride, the temperature of the reaction mixture is gradually raised from 5° C. to 20° C., while the reaction mixture is initially held at pH 6.5 and then at pH 8.0 by the continuous addition of 2N sodium hydroxide solution. After the condensation and elimination reaction has ended at pH 10.0 and 20° C., the resulting reactive dye of the formula

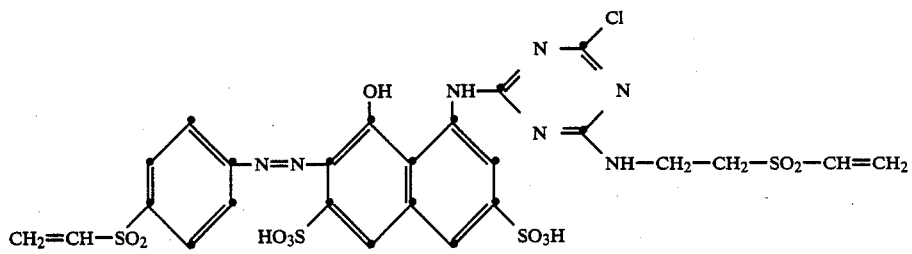

is salted out by sprinkling in potassium chloride at pH 7.0, is filtered off and is dried in vacuo. It dyes cotton in red shades.

The dyes in Table 1 can also be synthesised analogously to this variant of the preparation.

EXAMPLE 3

16.0 parts of 1-amino-8-hydroxynaphthalene-3,6-disulfonic acid are dissolved in 400 ml of water under neutral conditions, and the solution is cooled down to 0° to 5° C. 7.1 parts of 2,4,6-trifluoro-1,3,5-triazine are added dropwise at this temperature and pH 4.5 in the course of 15 minutes, during which the pH of the reaction solution is held acid to congo red by the simultaneous addition of 2N sodium hydroxide solution. After the addition of 11.4 parts of β-(β-chloroethylsulfonyl)-ethylamine hydrochloride, the reaction mixture is initially held briefly at pH 6.0 and then at pH 8.0 by the continuous addition of 2N sodium hydroxide solution while the temperature is raised from 20° to 25° C. in the course of 2 to 3 hours. After the condensation and elimination reaction has ended this dye intermediate is coupled at 0° to 10° C. and pH 6.0 with 14.1 parts of diazotised 1-amino-(4-(β-sulfatoethylsulfonyl)-benzene. After the coupling reaction has ended at pH 6.5, the reaction mixture is held at pH 9.0 at 20° C. by the continuous addition of 2N sodium hydroxide solution until the complete elimination is indicated by chromatography. Thereafter the reaction mixture is clarified at pH 6.5 and the synthesised reactive dye of the formula

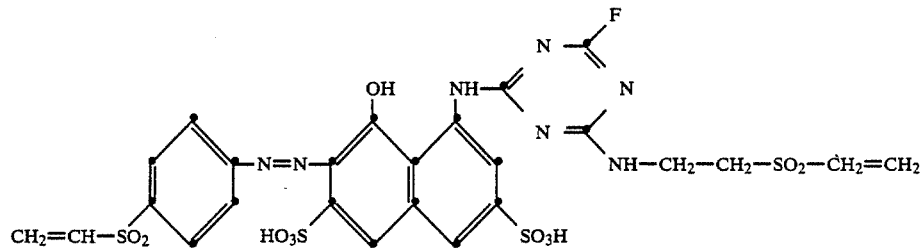

is salted out by sprinkling in sodium chloride, is filtered off and is dried in vacuo. It dyes cotton in red shades.

Other useful reactive dyes which dye cotton in the hues given in column 4 of Table 2 are obtained when, as in Example 3, 1-amino-8-hydroxynaphthalene-3,6-disulfonic acid is reacted first with 2,4,6-trifluoro-1,3,5-triazine and then with the amino compound given in column 2 and the diazotised diazo component indicated in column 3 is coupled onto the coupling component thus obtained. Not in every case is the coupling followed by an elimination, as described in Example 3.

TABLE 2

| No. | Amino compound | Diazo component | Hue on cotton |
|---|---|---|---|
| 1 | β-(β-chloroethylsulfonyl)-ethylamine hydrochloride | 1-amino-3-(β-sulfatoethylsulfonyl)-benzene | yellowish red |
| 2 | β-(β-chloroethylsulfonyl)-ethylamine hydrochloride | 1-amino-2-(β-sulfatoethylsulfonyl)-benzene | red |
| 3 | β-(β-chloroethylsulfonyl)-ethylamine hydrochloride | 1-amino-4-allysulfonyl-benzene | red |
| 4 | β-(β-chloroethylsulfonyl)-ethylamine hydrochloride | 1-amino-5-(2,3-dibromopropionylamino)-benzene-2-sulfonic acid | yellowish red |
| 5 | Bis-(β-(β-chloroethylsulfonyl)-ethyl)-amine hydrochloride | 1-amino-4-(β-sulfatoethylsulfonyl)-bezene | red |
| 6 | Bis-(β-(β-chloroethylsulfonyl)-ethyl)-amine hydrochloride | 1-amino-2-(β-sulfatoethylsulfonyl)-benzene | red |
| 7 | Bis-(β-(β-chloroethylsulfonyl)-ethyl)-amine hydrochloride | 1-amino-4-allysulfonyl-benzene | red |
| 8 | Bis-(β-(β-chloroethylsulfonyl)-ethyl)-amine hydrochloride | 1-amino-5-(2,3-dibromo-propionylamino)-benzene-2-sulfide acid | yellowish red |
| 9 | Bis-(Bβ-(β-chloroethysulfonyl)-ethyl)-amine hydrochloride | 1-amino-3-(β-sulfatoethylsulfonyl)-benzene | yellowish red |
| 10 | 3-(βChloroethylsulfonyl)-propylamine hydrochloride | 1-amino-4-(β-sulfatoethylsulfonyl)-benzene | red |
| 11 | 3-(βChloroethylsulfonyl)-propylamine hydrochloride | 1-amino-3-(β-sulfatoethylsulfonyl)-benzene | yellowish red |
| 12 | 3-(β-Chloroethylsulfonyl)-propylamine hydrochloride | 1-amino-2-(β-sulfatoethylsulfonyl)-benzene | red |
| 13 | 3-(β-Chloroethylsulfonyl)-propylamine hydrochloride | 1-amino-5-(2,3-dibromo-propionylamino)-benzene-2-sulfonic acid | yellowish red |
| 14 | 4-(β-Chloroethylsulfonyl)-butylamine hydrochloride | 1-amino-4-(β-sulfatoethylsulfonyl)-benzene | red |
| 15 | 4-(β-Chloroethylsulfonyl)-butylamine hydrochloride | 1-amino-3-(β-sulfatoethylsulfonyl)-benzene | yellowish red |
| 16 | 4-(β-Chloroethylsulfonyl)-butylamine hydrochloride | 1-amino-2-(β-sulfatoethyl sulfonyl)-benzene | red |
| 17 | 4-(β-Chloroethylsulfonyl)-butylamine hydrochloride | 1-amino-5-(2,3-dibromo-propionylamino)-benzene-2-sulfonic acid | yellowish red |
| 18 | β-(β-Chloroethylsulfonyl)-ethylamine hydrochloride | 1-amino-5-(4-(β-chloroethylsulfonyl)-butyrylamino)-benzene-2-sulfonic acid | yellowish red |
| 19 | Bis-(β-(β-chloroethylsulfonyl)-ethyl)-amine hydro- | 1-amino-5-(4-(β-chloroethylsulfonyl)-butyrylamino)- | yellowish red |

TABLE 2-continued

| No. | Amino compound | Diazo component | Hue on cotton |
|---|---|---|---|
| | chloride | benzene-2-sulfonic acid | |

EXAMPLE 4

A mixture of 28.1 parts of diazotised 1-amino-4-(β-sulfatoethylsulfonyl)-benzene and 300 parts of water is added at 0° to 5° C. to 76.5 parts, dissolved in 600 parts of water, of the coupling component of the formula

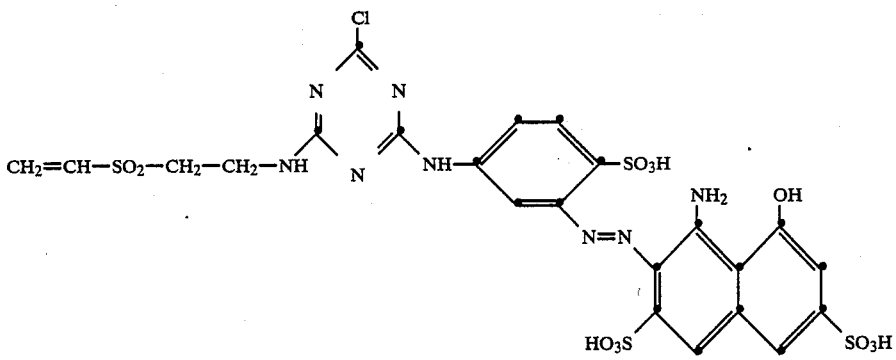

(prepared by acid coupling of diazotised 2-(3'-amino-4'-sulfophenylamino)-4-chloro-6-(β-vinylsulfonylethylamino)-1,3,5-triazine, prepared as described hereinafter, onto 1-amino-8-hydroxynaphthalene-3,6-disulfonic acid). After the coupling reaction at pH 6.5 has ended, the reaction mixture, at 20° C., is held at pH 10.0 by the continuous addition of 2N sodium hydroxide solution until the complete elimination is indicated by chromatography. Thereafter of the reaction mixture is clarified at pH 6.5 and the synthesised dye of the formula This solution is added dropwise in the course of 10 minutes to a mixture of 200 parts of ice and water, 18.5 parts of 2,4,6-trichloro-1,3,5-triazine and 10 parts of 37% hydrochloric acid. The reaction mixture is held at pH 1.5 until the condensation has ended by the continuous addition of 2N sodium hydroxide solution. After the addition of 22.9 parts of β-(β-chloroethylsulfonyl)-ethylamine hydrochloride, the temperature of the reaction mixture is gradually raised from 5° C. to 20° C. while the reaction mixture is initially held at pH 6.5 and then at pH 8.0 by the continuous addition of 2N sodium hydroxide solution. After the condensation and elimination reaction has ended, this reaction mixture is used directly for the acid coupling in Example 4.

Other useful reactive dyes which dye cotton in the hues indicated in column 4 of Table 3 are obtained when, as in Example 4, the diazotised diazo component

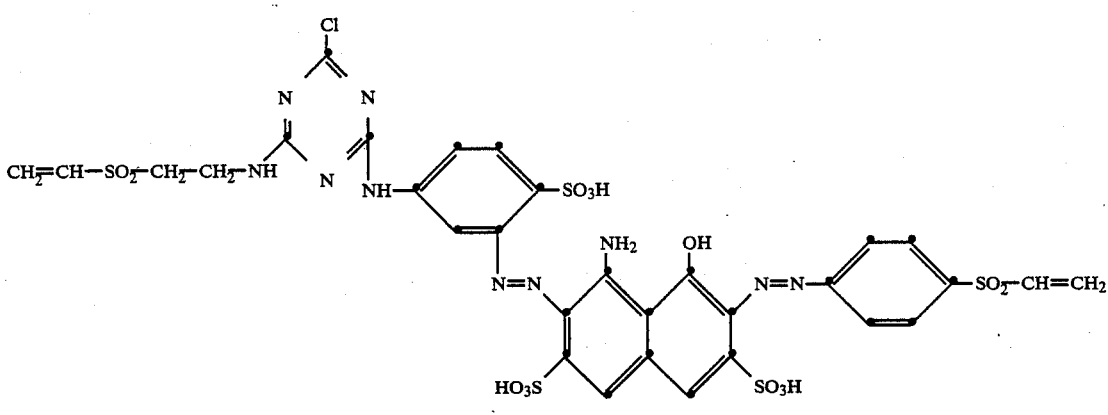

is salted out by sprinkling in sodium chloride, is filtered off and is dried in vacuo. It dyes cotton in greenish blue shades.

Preparation of 2-(3'-amino-4'-sulfophenylamino)-4-chloro-6-(β-vinylsulfonylethylamino)-1,3,5-triazine 18.8 parts of 1,3-diaminobenzene-4-sulfonic acid are dissolved in 100 parts of water under neutral conditions.

indicated in column 2 is coupled under acid conditions onto the 1-amino-8-hydroxynaphthalene-3,6-disulfonic acid, and the diazotised diazo component indicated in column 3 is coupled onto the monoazo compound obtained. Not in every case is the coupling reaction followed by an elimination reaction, as described in Example 4.

TABLE 3

| No. | Diazo component | Diazo component | Hue on cotton |
|---|---|---|---|
| 1 | 1-Amino-4-(β-sulfatoethyl-sulfonyl)-benzene | 2-(3'-amino-4'-sulfophenyl-amino)-4-chloro-6-(β-vinyl-sulfonylethylamino)-1,3,5-triazine | navy |
| 2 | 1-Amino-4-(β-sulfatoethyl-sulfonyl)-benzene | 2-(3'-amino-4',6'-disulfo-phenylamino)-4-chloro-6-(β-vinylsulfonylethylamino)-1,3,5-triazine | navy |
| 3 | 1-Amino-4-(β-sulfatoethyl-sulfonyl)-benzene | 2-(4'-amino-2',5'-disulfo-phenylamino)-4-chloro-6-(β-vinylsulfonylethylamino)-1,3,5-triazine | greenish blue |
| 4 | 1-Amino-4-(β-sulfatoethyl-sulfonyl)-benzene | 2-(3'-amino-4',6'-disulfo-phenylamino)-4-chloro-6-(β-(β-chloroethylsulfonyl)-ethylamino)-1,3,5-triazine | navy |
| 5 | 1-Amino-4-(β-sulfatoethyl-sulfonyl)-benzene | 2-(3'-amino-4'-sulfophenyl-amino)-4-chloro-6-bis-(β-vinylsulfonylethyl)-amino)-1,3,5-triazine | navy |
| 6 | 1-Amino-4-(β-sulfatoethyl-sulfonyl)-benzene | 2-(3'-amino-4'-sulfophenyl-amino)-4-fluoro-6-(β-vinyl-sulfonylethylamino)-1,3,5-triazine | navy |
| 7 | 1-Amino-4-(β-sulfatoethyl-sulfonyl)-benzene | 2-(3'-amino-4',6'-disulfophenyl-amino)-4-fluoro-6-(β-vinylsulfo-nylethylamino)-1,3,5-triazine | navy |
| 8 | 1-Amino-4-(β-sulfatoethyl-sulfonyl)-benzene | 2-(4'-amino-2',5'-disulfophenyl-amino)-4-fluoro-6-(β-vinylsulfo-nylethylamino)-1,3,5-triazine | greenish blue |
| 9 | 1-Amino-4-(β-sulfatoethyl-sulfonyl)-benzene | 2-(3'-amino-4',6'-disulfophenyl-amino)-4-fluoro-6-(β-(β-chloro-ethylsulfonyl)-ethylamino)-1,3,5-triazine | navy |
| 10 | 1-Amino-4-(β-sulfatoethyl-sulfonyl)-benzene | 2-(3'-amino-4'-sulfophenyl-amino)-4-fluoro-6-(bis-(β-vinylsulfonylethyl)-amino)-1,3,5-triazine | navy |
| 11 | 1-Amino-3-(β-sulfato-ethylsulfonyl)-benzene | 2-(3'-amino-4'-sulfophenylamino)-4-chloro-6-(β-vinylsulfonylethyl-amino)-1,3,5-triazine | navy |
| 12 | 1-Amino-3-(β-sulfato-ethylsulfonyl)-benzene | 2-(3'-amino-4',6'-disulfophenyl-amino)-4-chloro-6-(β-vinylsulfo-nylethylamino)-1,3,5-triazine | navy |
| 13 | 1-Amino-3-(β-sulfato-ethylsulfonyl)-benzene | 2-(4'-amino-2',5'-disulfophenyl-amino)-4-chloro-6-(β-vinylsulfo-nylethylamino)-1,3,5-triazine | greenish blue |
| 14 | 1-Amino-3-(β-sulfato-ethylsulfonyl)-benzene | 2-(3'-amino-4',6'-disulfophenyl-amino)-4-chloro-6-(β-(β-chloro-ethylsulfonyl)-ethylamino)-1,3,5-triazine | navy |
| 15 | 1-Amino-3-(β-sulfato-ethylsulfonyl)-benzene | 2-(3'-amino-4'-sulfophenylamino)-4-chloro-6-(bis-(β-vinylsulfonyl-ethyl)-amino)-1,3,5-triazine | navy |
| 16 | 1-Amino-3-(β-sulfato-ethylsulfonyl)-benzene | 2-(3'-amino-4'-sulfophenylamino)-4-fluoro-6-(β-vinylsulfonylethyl-amino)-1,3,5-triazine | navy |
| 17 | 1-Amino-3-(β-sulfato-ethylsulfonyl)-benzene | 2-(3'-amino-4',6'-disulfophenyl-amino)-4-fluoro-6-(β-vinylsulfo-nylethylamino)-1,3,5-triazine | navy |
| 18 | 1-Amino-3-(β-sulfato-ethylsulfonyl)-benzene | 2-(4'-amino-2',5'-disulfophenyl-amino)-4-fluoro-6-(β-vinylsulfo-nylethylamino)-1,3,5-triazine | greenish blue |
| 19 | 1-Amino-3-(β-sulfato-ethylsulfonyl)-benzene | 2-(3'-amino-4',6'-disulfophenyl-amino)-4-fluoro-6-(β-(β-chloro-ethylsulfonyl)-ethylamino)-1,3,5-triazine | navy |
| 20 | 1-Amino-3-(β-sulfato-ethylsulfonyl)-benzene | 2-(3'-amino-4'-sulfophenylamino)-4-fluoro-6-(bis-(β-vinylsulfonyl-ethyl)-amino)-1,3,5-triazine | navy |
| 21 | 1-Amino-2-(β-sulfato-ethylsulfonyl)-benzene | 2-(3'-amino-4'-sulfophenylamino)-4-chloro-6-(β-vinylsulfonylethyl-amino)-1,3,5-triazine | navy |
| 22 | 1-Amino-2-(β-sulfato-ethylsulfonyl)-benzene | 2-(3'-amino-4',6'-disulfophenyl-amino)-4-chloro-6-(β-vinylsulfo-nylethylamino)-1,3,5-triazine | navy |
| 23 | 1-Amino-2-(β-sulfato-ethylsulfonyl)-benzene | 2-(4'-amino-2',5'-disulfophenyl-amino)-4-chloro-6-(β-vinylsulfo-nylethylamino)-1,3,5-triazine | greenish blue |
| 24 | 1-Amino-2-(β-sulfato- | 2-(3'-amino-4',6'-disulfophenyl- | navy |

TABLE 3-continued

| No. | Diazo component | Diazo component | Hue on cotton |
|---|---|---|---|
| | ethylsulfonyl)-benzene | amino)-4-chloro-6-(β-(β-chloro-ethylsulfonyl)-ethylamino)-1,3,5-triazine | |
| 25 | 1-Amino-2-(β-sulfato-ethylsulfonyl)-benzene | 2-(3'-amino-4'-sulfophenylamino)-4-chloro-6-(bis-(β-vinylsulfonyl-ethyl)-amino)-1,3,5-triazine | navy |
| 26 | 1-Amino-2-(β-sulfato-ethylsulfonyl)-benzene | 2-(3'-amino-4'-sulfophenylamino)-4-fluoro-6-(β-vinylsulfonylethyl-amino)-1,3,5-triazine | navy |
| 27 | 1-Amino-2-(β-sulfato-ethylsulfonyl)-benzene | 2-(3'-amino-4',6'-disulfophenyl-amino)-4-fluoro-6-(β-vinylsulfo-nylethylamino)-1,3,5-triazine | navy |
| 28 | 1-Amino-2-(β-sulfato-ethylsulfonyl)-benzene | 2-(4'-amino-2',5'-disulfophenyl-amino)-4-fluoro-6-(β-vinylsulfo-nyl-ethylamino)-1,3,5-triazine | greenish blue |
| 29 | 1-Amino-2-(β-sulfato-ethylsulfonyl)-benzene | 2-(3'-amino-4',6'-disulfophenyl-amino)-4-fluoro-6-(β-(β-chloro-ethylsulfonyl)-ethylamino)-1,3,5-triazine | navy |
| 30 | 1-Amino-2-(β-sulfato-ethylsulfonyl)-benzene | 2-(3'-amino-4'-sulfophenylamino)-4-fluoro-6-(bis-(β-vinylsulfonyl-ethyl)-amino)-1,3,5-triazine | navy |
| 31 | 1-Amino-4-allylsulfo-nyl-benzene | 2-(3'-amino-4'-sulfophenylamino)-4-chloro-6-(β-vinylsulfonylethyl-amino)-1,3,5-triazine | navy |
| 32 | 1-Amino-4-allylsulfo-nyl-benzene | 2-(3'-amino-4',6'-disulfophenyl-amino)-4-chloro-6-(β-vinylsulfo-nylethylamino)-1,3,5-triazine | navy |
| 33 | 1-Amino-4-allylsulfo-nyl-benzene | 2-(4'-amino-2',5'-disulfophenyl-amino)-4-chloro-6-(β-vinylsulfo-nylethylamino)-1,3,5-triazine | greenish blue |
| 34 | 1-Amino-4-allylsulfo-nyl-benzene | 2-(3'-amino-4',6'-disulfophenyl-amino)-4-chloro-6-(β-(β-chloro-ethylsulfonyl)-ethylamino)-1,3,5-triazine | navy |
| 35 | 1-Amino-4-allylsulfo-nyl-benzene | 2-(3'-amino-4'-sulfophenylamino)-4-chloro-6-(bis-(β-vinylsulfonyl-ethyl)-amino)-1,3,5-triazine | navy |
| 36 | 1-Amino-4-allylsulfo-nyl-benzene | 2-(3'-amino-4'-sulfophenylamino)-4-fluoro-6-(β-vinylsulfonylethyl-amino)-1,3,5-triazine | navy |
| 37 | 1-Amino-4-allylsulfo-nyl-benzene | 2-(3'-amino-4',6'-disulfophenyl-amino)-4-fluoro-6-(β-vinylsulfo-nylethylamino)-1,3,5-triazine | navy |
| 38 | 1-Amino-4-allylsulfo-nyl-benzene | 2-(4'-amino-2',5'-disulfophenyl-amine)-4-fluoro-6-(β-vinylsulfo-nylethylamino)-1,3,5-triazine | greenish blue |
| 39 | 1-Amino-4-allylsulfo-nyl-benzene | 2-(3'-amino-4',6'-disulfophenyl-amino)-4-fluoro-6-(β-(β-chloro-ethylsulfonyl)-ethylamino)-1,3,5-triazine | navy |
| 40 | 1-Amino-4-allylsulfo-nyl-benzene | 2-(3'-amino-4'-sulfophenylamino)-4-fluoro-6-(bis-(β-vinylsulfonyl-ethyl)-amino)-1,3,5-triazine | navy |
| 41 | 1-Amino-5-(2,3-dibromo-propionylamino)-benzene-2-sulfonic acid | 2-(3'-amino-4'-sulfophenylamino)-4-chloro-6-(β-vinylsulfonylethyl-amino)-1,3,5-triazine | navy |
| 42 | 1-Amino-5-(2,3-dibromo-propionylamino)-benzene-2-sulfonic acid | 2-(3'-amino-4',6'-disulfophenyl-amino)-4-chloro-6-(β-vinylsulfo-nylethylamino)-1,3,5-triazine | navy |
| 43 | 1-Amino-5-(2,3-dibromo-propionylamino)-benzene-2-sulfonic acid | 2-(4'-amino-2',5'-disulfophenyl-amino)-4-chloro-6-(β-vinylsulfo-nylethylamino)-1,3,5-triazine | greenish blue |
| 44 | 1-Amino-5-(2,3-dibromo-propionylamino)-benzene-2-sulfonic acid | 2-(3'-amino-4',6'-disulfophenyl-amino)-4-chloro-6-(β-(β-chloro-ethylsulfonyl)-ethylamino)-1,3,5-triazine | navy |
| 45 | 1-Amino-5-(2,3-dibromo-propionylamino)-benzene-2-sulfonic acid | 2-(3'-amino-4'-sulfophenylamino)-4-chloro-6-(bis-(β-vinylsulfonyl-ethyl)-amino)-1,3,5-triazine | navy |
| 46 | 1-Amino-5-(2,3-dibromo-propionylamino)-benzene-2-sulfonic acid | 2-(3'-amino-4'-sulfophenylamino)-4-fluoro-6-(β-vinylsulfonylethyl-amino)-1,3,5-triazine | navy |
| 47 | 1-Amino-5-(2,3-dibromo-propionylamino)-benzene-2-sulfonic acid | 2-(3'-amino-4',6'-disulfophenyl-amino)-4-fluoro-6-(β-vinylsulfo-nylethylamino)-1,3,5-triazine | navy |
| 48 | 1-Amino-5-(2,3-dibromo-propionylamino)-benzene-2-sulfonic acid | 2-(4'-amino-2',5'-disulfophenyl-amino)-4-fluoro-6-(β-vinylsulfo-nylethylamino)-1,3,5-triazine | greenish blue |
| 49 | 1-Amino-5-(2,3-dibromo- | 2-(3'-amino-4',6'-disulfophenyl- | navy |

TABLE 3-continued

| No. | Diazo component | Diazo component | Hue on cotton |
|---|---|---|---|
| | propionylamino)-benzene-2-sulfonic acid | amino)-4-fluoro-6-(β-(β-chloro-ethylsulfonyl)-ethylamino)-1,3,5-triazine | |
| 50 | 1-Amino-5-(2,3-dibromo-propionylamino)-benzene-2-sulfonic acid | 2-(3'-amino-4'-sulfophenylamino)-4-fluoro-6-(bis-(β-vinylsulfonyl-ethyl)-amino)-1,3,5-triazine | navy |
| 51 | 1-Amino-5-(α-bromo-acryloylamino)-benzene-2-sulfonic acid | 2-(3'-amino-4'-sulfophenylamino)-4-chloro-6-(β-vinylsulfonylethyl-amino)-1,3,5-triazine | navy |
| 52 | 1-Amino-5-(α-bromo-acryloylamino)-benzene-2-sulfonic acid | 2-(3'-amino-4',6'-disulfophenyl-amino)-4-chloro-6-(β-vinylsulfo-nylethylamino)-1,3,5-triazine | navy |
| 53 | 1-Amino-5-(α-bromo-acryloylamino)-benzene-2-sulfonic acid | 2-(4'-amino-2',5'-disulfophenyl-amino)-4-chloro-6-(β-vinylsulfo-nylethylamino)-1,3,5-triazine | greenish blue |
| 54 | 1-Amino-5-(α-bromo-acryloylamino)-benzene-2-sulfonic acid | 2-(3'-amino-4',6'-disulfophenyl-amino)-4-chloro-6-(β-(β-chloro-ethylsulfonyl)-ethylamino)-1,3,5-triazine | navy |
| 55 | 1-Amino-5-(α-bromo-acryloylamino)-benzene-2-sulfonic acid | 2-(3'-amino-4'-sulfophenylamino)-4-chloro-6-(bis-(β-vinylsulfonyl-ethyl)-amino)-1,3,5-triazine | navy |
| 56 | 1-Amino-5-(α-bromo-acryloylamino)-benzene-2-sulfonic acid | 2-(3'-amino-4'-sulfophenylamino)-4-fluoro-6-(β-vinylsulfonylethyl-amino)-1,3,5-triazine | navy |
| 57 | 1-Amino-5-(α-bromo-acryloylamino)-benzene-2-sulfonic acid | 2-(3'-amino-4',6'-disulfophenyl-amino)-4-fluoro-6-(β-vinylsulfo-nylethylamino)-1,3,5-triazine | navy |
| 58 | 1-Amino-5-(α-bromo-acryloylamino)-benzene-2-sulfonic acid | 2-(4'-amino-2',5'-disulfophenyl-amino)-4-fluoro-6-(β-vinylsulfo-nylethylamino)-1,3,5-triazine | greenish blue |
| 59 | 1-Amino-5-(α-bromo-acryloylamino)-benzene-2-sulfonic acid | 2-(3'-amino-4',6'-disulfophenyl-amino)-4-fluoro-6-(β-(β-chloro ethylsulfonyl)-ethylamino)-1,3,5-triazine | navy |
| 60 | 1-Amino-5-(αbromo acryloylamino)-benzene-2-sulfonic acid | 2-(3'-amino-4'-sulfophenylamino)-4-fluoro-6-(bis-(β-vinylsulfonyl-ethyl)-amino)-1,3,5-triazine | navy |
| 61 | 1-Amino-5-(2,3-dichloro-propionylamino)-benzene-2-sulfonic acid | 2-(3'-amino-4'-sulfophenylamino)-4-chloro-6-(β-vinylsulfonylethyl-amino)-1,3,5-triazine | navy |
| 62 | 1-Amino-5-(2,3-dichloro-propionylamino)-benzene-2-sulfonic acid | 2-(3'-amino-4',6'-disulfophenyl-amino)-4-chloro-6-(β-vinylsulfo-nylethylamino)-1,3,5-triazine | navy |
| 63 | 1-Amino-5-(2,3-dichloro-propionylamino)-benzene-2-sulfonic acid | 2-(4'-amino-2',5'-disulfophenyl-amino)-4-chloro-6-(β-vinylsulfo-nylethylamino)-1,3,5-triazine | greenish blue |
| 64 | 1-Amino-5-(2,3-dichloro-propionylamino)-benzene 2-sulfonic acid | 2-(3'-amino-4',6'-disulfophenyl-amino)-4-chloro-6-(β-(β-chloro-ethylsulfonyl)-ethylamino)-1,3,5-triazine | navy |
| 65 | 1-Amino-5-(2,3-dichloro-propionylamino)-benzene 2-sulfonic acid | 2-(3'-amino-4'-sulfophenylamino)-4-chloro-6-(bis-(β-vinylsulfonyl-ethyl)-amino)-1,3,5-triazine | navy |
| 66 | 1-Amino-5-(2,3-dichloro-propionylamino)-benzene 2-sulfonic acid | 2-(3'-amino-4'-sulfophenylamino)-4-fluoro-6-(β-vinylsulfonylethyl-amino)-1,3,5-triazine | navy |
| 67 | 1-Amino-5-(2,3-dichloro-propionylamino)-benzene 2-sulfonic acid | 2-(3'-amino-4'-disulfophenyl)-amino)-4-fluoro-6-(β-vinylsulfo-nylethylamino)-1,3,5-triazine | navy |
| 68 | 1-Amino-5-(2,3-dichloro-propionylamino)-benzene 2-sulfonic acid | 2-(4'-amino-2',5'-disulfophenyl-amino)-4-fluoro-6-(β-vinylsulfo-nylethylamino)-1,3,5-triazine | greenish blue |
| 69 | 1-Amino-5-(2,3-dichloro-propionylamino)-benzene 2-sulfonic acid | 2-(3'-amino-4',6'-disulfophenyl-amino)-4-fluoro-6-(β-(β-chloro-ethylsulfonyl)-ethylamino)-1,3,5-triazine | navy |
| 70 | 1-Amino-5-(2,3-dichloro-propionylamino)-benzene 2-sulfonic acid | 2-(3'-amino-4'-sulfophenylamino)-4-fluoro-6-(bis-(β-vinylsulfonyl-ethyl)-amino)-1,3,5-triazine | navy |
| 71 | 1-Amino-5-chloroacetyl-amino-benzene-2-sulfo-nic acid | 2-(3'-amino-4'-sulfophenylamino)-4-chloro-6-(β-vinylsulfonylethyl-amino)-1,3,5-triazine | navy |
| 72 | 1-Amino-5-chloroacetyl-amino-benzene-2-sulfo-nic acid | 2-(3'-amino-4',6'-disulfophenyl-amino)-4-chloro-6-(β-vinylsulfo-nylethylamino)-1,3,5-triazine | navy |
| 73 | 1-Amino-5-chloroacetyl-amino-benzene-2-sulfo-nic acid | 2-(4'-amino-2',5'-disulfophenyl-amino)-4-chloro-6-(β-vinylsulfo-nylethylamino)-1,3,5-triazine | greenish blue |
| 74 | 1-Amino-5-chloroacetyl- | 2-(3'-amino-4',6'-disulfophenyl- | navy |

TABLE 3-continued

| No. | Diazo component | Diazo component | Hue on cotton |
|---|---|---|---|
| | amino-benzene-2-sulfonic acid | amino)-4-chloro-6-(β-(β-chloroethylsulfonyl)-ethylamino)-1,3,5-triazine | |
| 75 | 1-Amino-5-chloroacetylamino-benzene-2-sulfonic acid | 2-(3'-amino-4'-sulfophenylamino)-4-chloro-6-(bis-(β-vinylsulfonylethyl)-amino)-1,3,5-triazine | navy |
| 76 | 1-Amino-5-chloroacetylamino-benzene-2-sulfonic acid | 2-(3'-amino-4'-sulfophenylamino)-4-fluoro-6-(β-vinylsulfonylethylamino)-1,3,5-triazine | navy |
| 77 | 1-Amino-5-chloroacetylamino-benzene-2-sulfonic acid | 2-(3'-amino-4',6'-disulfophenylamino)-4-fluoro-6-(β-vinylsulfonylethylamino)-1,3,5-triazine | navy |
| 78 | 1-Amino-5-chloroacetylamino-benzene-2-sulfonic acid | 2-(4'-amino-2',5'-disulfophenylamino)-4-fluoro-6-(β-vinylsulfonylethylamino)-1,3,5-triazine | greenish blue |
| 79 | 1-Amino-5-chloroacetylamino-benzene-2-sulfonic acid | 2-(3'-amino-4',6'-disulfophenylamino)-4-fluoro-6-(β-(β-chloroethylsulfonyl)-ethylamino)-1,3,5-triazine | navy |
| 80 | 1-Amino-5-chloroacetylamino-benzene-2-sulfonic acid | 2-(3'-amino-4'-sulfophenylamino)-4-fluoro-6-(bis-((β-vinylsulfonyl)-ethyl)-amino)-1,3,5-triazine | navy |
| 81 | 2-(3'-Amino-4',6'-disulfonylamino-4-chloro-6-(β-vinylsulfonylethylamino)-1,3,5-triazene | 1-amino-4-(β-sulfatoethylsulfonyl)-benzene | greenish blue |
| 82 | 2-(4'-Amino-2',5'-disulfophenylamino)-4-chloro-6-(β-vinylsulfonylethyl-amino)-1,3,5-triazine | 1-amino-4-(β-sulfatoethylsulfonyl)-benzene | greenish blue |
| 83 | 2-(3'-Amino-4',6'-disulfophenylamino)-4-chloro-6-(β-(β-chloroethylsulfonyl)-ethylamino)-1,3,5-triazine | 1-amino-4-(β-sulfatoethylsulfonyl)-benzene | greenish blue |
| 84 | 2-(3'-Amino-4'-sulfophenyl)-amino-4-chloro-6-(bis-(β-vinylsulfonylethyl)-amino)-1,3,5-triazine | 1-amino-4-(β-sulfatoethylsulfonyl)-benzene | greenish blue |
| 85 | 2-(3'-Amino-4'-sulfophenylamino)-4-fluoro-6-(β-vinylsulfonylethylamino)-1,3,5-triazine | 1-amino-4-(β-sulfatoethylsulfonyl)-benzene | greenish blue |
| 86 | 2-(3'-Amino-4',6'-disulfophenylamino)-4-fluoro-6-(β-vinylsulfonylethylamino)-1,3,5-triazine | 1-amino-4-(β-sulfatoethylsulfonyl)-benzene | greenish blue |
| 87 | 2-(4'-Amino-2',5'-disulfophenylamino)-4-fluoro-6-(β-vinylsulfonylethylamino)-1,3,5-triazine | 1-amino-4-(β-sulfatoethylsulfonyl)-benzene | greenish blue |
| 88 | 2-(3'-Amino-4',6'-disulfophenylamino)-4-fluoro-6-(β-(β-chloroethylsulfonyl)-ethylamino)-1,3,5-triazine | 1-amino-4-(β-sulfatoethylsulfonyl)-benzene | greenish blue |
| 89 | 2-(3'-Amino-4'-sulfophenylamino)-4-fluoro-6-(bis(β-vinylsulfonylethyl)-amino)-1,3,5-triazine | 1-amino-4-(β-sulfatoethylsulfonyl)-benzene | greenish blue |
| 90 | 2-(3'-Amino-4'-sulfophenylamino)-4-chloro-6-(β-vinylsulfonylethylamino)-1,3,5-triazine | 1-amino-3-(-sulfatoethylsulfonyl)-benzene | greenish blue |
| 91 | 2-(3'-Amino-4',6'-disulfophenylamino)-4-chloro-6-(β-vinylsulfonylethylamino)-1,3,5-triazine | 1-amino-3-(-sulfatoethylsulfonyl)-benzene | greenish blue |
| 92 | 2-(4'-Amino-2',5'-disulfophenylamino)-4-chloro-6-(β-vinylsulfonylethylamino)-1,3,5-triazine | 1-amino-3-(-sulfatoethylsulfonyl)-benzene | greenish blue |
| 93 | 2-(3'-Amino-4',6'-disulfophenylamino)-4-chloro-6-(β-(β-chloroethylsulfonyl)-ethylamino)-1,3,5-triazine | 1-amino-3-(β-sulfatoethylsulfonyl)-benaene | greenish blue |
| 94 | 2-(3'-Amino-4'-sulfophenylamino)-4-chloro-6-(bis(β-vinylsulfonylethyl)-amino)-1,3,5-triazine | 1-amino-3-(β-sulfatoethylsulfonyl)-benaene | greenish blue |
| 95 | 2-(3'-Amino-4'-sulfophenylamino)-4-fluoro-6-(β-vinylsulfonylethylamino)-1,3,5-triazine | 1-amino-3-(β-sulfatoethylsulfonyl)-benaene | greenish blue |
| 96 | 2-(3'-Amino-4',6'-disulfophenyl- | 1-amino-3-(β-sulfato- | greenish |

TABLE 3-continued

| No. | Diazo component | Diazo component | Hue on cotton |
|---|---|---|---|
| | amino)-4-fluoro-6-(β-vinylsulfonylethylamino)-1,3,5-triazine | ethylsulfonyl)-benaene | blue |
| 97 | 2-(4'-Amino-2',5'-disulfophenylamino)-4-fluoro-6-(β-vinylsulfonylethylamino)-1,3,5-triazine | 1-amino-3-(β-sulfatoethylsulfonyl)-benaene | greenish blue |
| 98 | 2-(3'-Amino-4',6'-disulfophenylamino)-4-fluoro-6-(β-(β-chloroethylsulfonyl)-ethylamino)-1,3,5-triazine | 1-amino-3-(β-sulfatoethylsulfonyl)-benaene | greenish blue |
| 99 | 2-(3'-Amino-4'-sulfophenylamino)-4-fluoro-6-(bis(β-vinylsulfonylethyl)-amino)-1,3,5-triazine | 1-amino-3-(β-sulfatoethylsulfonyl)-benaene | greenish blue |
| 100 | 2-(3'-Amino-4'-sulfophenylamino)-4-chloro-6-(β-vinylsulfonylethylamino)-1,3,5-triazine | 1-amino-2-(β-sulfatoethylsulfonyl)-benzene | greenish blue |
| 101 | 2-(3'-Amino-4',6'-disulfophenylamino)-4-chloro-6-(β-vinylsulfonylethylamino)-1,3,5-triazine | 1-amino-2-(β-sulfatoethylsulfonyl)-benzene | greenish blue |
| 102 | 2-(4'-Amino-2',5'-disulfophenylamino)-4-chloro-6-(β-vinylsulfonylethylamino)-1,3,5-triazine | 1-amino-2-(β-sulfatoethylsulfonyl)-benzene | greenish blue |
| 103 | 2-(3'-Amino-4',6'-disulfophenylamino)-4-chloro-6-(β-(β-chloroethylsulfonyl)-ethylamino)-1,3,5-triazine | 1-amino-2-(β-sulfatoethylsulfonyl)-benzene | greenish blue |
| 104 | 2-(3'-Amino-4'-sulfophenylamino)-4-chloro-6-(bis-(β-vinylsulfonylethyl)-amino)-1,3,5-triazine | 1-amino-2-(β-sulfatoethylsulfonyl)-benzene | greenish blue |
| 105 | 2-(3'-Amino-4'-sulfophenylamino)-4-fluoro-6-(β-vinylsulfonylethylamino)-1,3,5-triazine | 1-amino-2-(β-sulfatoethylsulfonyl)-benzene | greenish blue |
| 106 | 2-(3'-Amino-4',6'-disulfophenylamino)-4-fluoro-6-(β-vinylsulfonylethylamino)-1,3,5-triazine | 1-amino-2-(β-sulfatoethylsulfonyl)-benzene | greenish blue |
| 107 | 2-(4'-Amino-2',5'-disulfophenylamino)-4-fluoro-6-(β-vinylsulfonylethylamino)-1,3,5-triazine | 1-amino-2-(β-sulfatoethylsulfonyl)-benzene | greenish blue |
| 108 | 2-(3'-Amino-4',6'-disulfophenylamino)-4-fluoro-6-(β-(β-chloroethylsulfonyl)-ethylamino)-1,3,5-triazine | 1-amino-2-(β-sulfatoethylsulfonyl)-benzene | greenish blue |
| 109 | 2-(3'-Amino-4'-sulfophenylamino)-4-fluoro-6-(bis-(β-vinylsulfonylethyl)-amino)-1,3,5-triazine | 1-amino-2-(β-sulfatoethylsulfonyl)-benzene | greenish blue |
| 110 | 2-(3'-Amino-4'-sulfophenylamino)-4-chloro-6-(β-vinylsulfonylethylamino)-1,3,5-triazine | 1-amino-4-allylsulfonyl benzene | greenish blue |
| 111 | 2-(3'-Amino-4',6'-disulfophenylamino)-4-chloro-6-(β-vinylsulfonylethylamino)-1,3,5-triazine | 1-amino-4-allylsulfonyl benzene | greenish blue |
| 112 | 2-(4'-Amino-2',5'-disulfophenylamino)-4-chloro-6-(β-vinylsulfonylethylamino)-1,3,5-triazine | 1-amino-4-allylsulfonyl benzene | greenish blue |
| 113 | 2-(3'-Amino-4',6'-disulfophenylamino)-4-chloro-6-(β-(β-chloroethylsulfonyl)-ethylamino)-1,3,5-triazine | 1-amino-4-allylsulfonyl benzene | greenish blue |
| 114 | 2-(3'-Amino-4'-sulfophenylamino)-4-chloro-6-(bis-(β-vinylsulfonylethyl)-amino)-1,3,5-triazine | 1-amino-4-allylsulfonyl benzene | greenish blue |
| 115 | 2-(3'-Amino-4'-sulfophenylamino)-4-fluoro-6-(β-vinylsulfonylethylamino)-1,3,5-triazine | 1-amino-4-allylsulfonyl benzene | greenish blue |
| 116 | 2-(3'-Amino-4',6'-disulfophenylamino)-4-fluoro-6-(β-vinylsulfonylethylamino)-1,3,5-triazine | 1-amino-4-allylsulfonyl benzene | greenish blue |
| 117 | 2-(4'-Amino-2',5'-disulfophenylamino)-4-fluoro-6-(β-vinylsulfonylethylamino)-1,3,5-triazine | 1-amino-4-allylsulfonyl benzene | greenish blue |
| 118 | 2-(3'-Amino-4',6'-disulfophenylamino)-4-fluoro-6-(β-(β-chloroethylsulfonyl)-ethylamino)-1,3,5-triazine | 1-amino-4-allylsulfonyl benzene | greenish blue |
| 119 | 2-(3'-Amino-4'-sulfophenylamino)-4-fluoro-6-(bis(β-vinylsulfonylethyl)-amino)-1,3,5-triazine | 1-amino-4-allylsulfonyl benzene | greenish blue |
| 120 | 2-(3'-Amino-4'-sulfophenylamino)-4-chloro-6-(β-vinylsulfonylethylamino)-1,3,5-triazine | 1-amino-5-(2,3-dibromopropionylamino)-benzene-2-sulfonic acid | greenish blue |
| 121 | 2-(3'-Amino-4',6'-disulfophenyl- | 1-amino-5-(2,3-dibromo- | greenish |

TABLE 3-continued

| No. | Diazo component | Diazo component | Hue on cotton |
|---|---|---|---|
| | amino)-4-chloro-6-(β-vinylsulfonylethylamino)-1,3,5-triazine | propionylamino)-benzene-2-sulfonic acid | blue |
| 122 | 2-(4'-Amino-2',5'-disulfophenylamino)-4-chloro-6-(β-vinylsulfonylethylamino)-1,3,5-triazine | 1-amino-5-(2,3-dibromopropionylamino)-benzene-2-sulfonic acid | greenish blue |
| 123 | 2-(3'-Amino-4',6'-disulfophenylamino)-4-chloro-6-(β-(β-chloroethylsulfonyl)-ethylamino)-1,3,5-triazine | 1-amino-5-(2,3-dibromopropionylamino)-benzene-2-sulfonic acid | greenish blue |
| 124 | 2-(3'-Amino-4'-sulfophenylamino)-4-chloro-6-(bis-(β-vinylsulfonylethyl)-amino)-1,3,5-triazine | 1-amino-5-(2,3-dibromopropionylamino)-benzene-2-sulfonic acid | greenish blue |
| 125 | 2-(3'-Amino-4'-sulfophenylamino)-4-fluoro-6-(β-vinylsulfonylethylamino)-1,3,5-triazine | 1-amino-5-(2,3-dibromopropionylamino)-benzene-2-sulfonic acid | greenish blue |
| 126 | 2-(3'-Amino-4',6'-disulfophenylamino)-4-fluoro-6-(β-vinylsulfonylethylamino)-1,3,5-triazine | 1-amino-5-(2,3-dibromopropionylamino)-benzene-2-sulfonic acid | greenish blue |
| 127 | 2-(4'-Amino-2',5'-disulfophenylamino)-4-fluoro-6-(β-vinylsulfonylethylamino)-1,3,5-triazine | 1-amino-5-(2,3-dibromopropionylamino)-benzene-2-sulfonic acid | greenish blue |
| 128 | 2-(3'-Amino-4',6'-disulfophenylamino)-4-fluoro-6-(β-(β-chloroethylsulfonyl)-ethylamino)-1,3,5-triazine | 1-amino-5-(2,3-dibromopropionylamino)-benzene-2-sulfonic acid | greenish blue |
| 129 | 2-(3'-Amino-4'-sulfophenylamino)-4-fluoro-6-(bis-(β-vinylsulfonylethyl)-amino)-1,3,5-triazine | 1-amino-5-(2,3-dibromopropionylamino)-benzene-2-sulfonic acid | greenish blue |
| 130 | 2-(3'-Amino-4'-sulfophenylamino)-4-chloro-6-(β-vinylsulfonylethylamino)-1,3,5-triazine | 1-amino-5-(α-bromoacryloylamino)-benzene-2-sulfonic acid | greenish blue |
| 131 | 2-(3'-Amino-4',6'-disulfophenylamino)-4-chloro-6-(β-vinylsulfonylethylamino)-1,3,5-triazine | 1-amino-5-(α-bromoacryloylamino)-benzene-2-sulfonic acid | greenish blue |
| 132 | 2-(4'-Amino-2',5'-disulfophenylamino)-4-chloro-6-(β-vinylsulfonylethylamino)-1,3,5-triazine | 1-amino-5-(α-bromoacryloylamino)-benzene-2-sulfonic acid | greenish blue |
| 133 | 2-(3'-Amino-4',6'-disulfophenylamino)-4-chloro-6-(β-(β-chloroethylsulfonyl)-ethylamino)-1,3,5-triazine | 1-amino-5-(α-bromoacryloylamino)-benzene-2-sulfonic acid | greenish blue |
| 134 | 2-(3'-Amino-4'-sulfophenylamino)-4-chloro-6-(bis-(β-vinylsulfonylethyl)-amino)-1,3,5-triazine | 1-amino-5-(α-bromoacryloylamino)-benzene-2-sulfonic acid | greenish blue |
| 135 | 2-(3'-Amino-4'-sulfophenylamino)-4-fluoro-6-(β-vinylsulfonylethylamino)-1,3,5-triazine | 1-amino-5-(α-bromoacryloylamino)-benzene-2-sulfonic acid | greenish blue |
| 136 | 2-(3'-Amino-4',6'-disulfophenylamino)-4-fluoro-6-(β-vinylsulfonylethylamino)-1,3,5-triazine | 1-amino-5-(α-bromoacryloylamino)-benzene-2-sulfonic acid | greenish blue |
| 137 | 2-(4'-Amino-2',5'-disulfophenylamino)-4-fluoro-6-(β-vinylsulfonylethylamino)-1,3,5-triazine | 1-amino-5-(α-bromoacryloylamino)-benzene-2-sulfonic acid | greenish blue |
| 138 | 2-(3'-Amino-4',6'-disulfophenylamino)-4-fluoro-6-(β-(β-chloroethylsulfonyl)-ethylamino)-1,3,5-triazine | 1-amino-5-(α-bromoacryloylamino)-benzene-2-sulfonic acid | greenish blue |
| 139 | 2-(3'-Amino-4'-sulfophenylamino)-4-fluoro-6-(bis(β-vinylsulfonylethyl)-amino)-1,3,5-triazine | 1-amino-5-(α-bromoacryloylamino)-benzene-2-sulfonic acid | greenish blue |
| 140 | 2-(3'-Amino-4'-sulfophenylamino)-4-chloro-6-(βvinylsulfonylethylamino)-1,3,5-triazine | 1-amino-5-(2,3-dichloropropionylamino)-benzene-2-sulfonic acid | greenish blue |
| 141 | 2-(3'-Amino-4',6'-disulfophenylamino)-4-chloro-6-(β-vinylsulfonylethylamino)-1,3,5-triazine | 1-amino-5-(2,3-dichloropropionylamino)-benzene-2-sulfonic acid | greenish blue |
| 142 | 2-(4'-Amino-2',5'-disulfophenylamino)-4-chloro-6-(β-vinylsulfonylethylamino)-1,3,5-triazine | 1-amino-5-(2,3-dichloropropionylamino)-benzene-2-sulfonic acid | greenish blue |
| 143 | 2-(3'-Amino-4',6'-disulfophenylamino)-4-chloro-6-(β-(β-chloroethylsulfonyl)-ethylamino)-1,3,5-triazine | 1-amino-5-(2,3-dichloropropionylamino)-benzene-2-sulfonic acid | greenish blue |
| 144 | 2-(3'-Amino-4'-sulfophenylamino)-4-chloro-6-(bis-(β-vinylsulfonylethyl)-amino)-1,3,5-triazine | 1-amino-5-(2,3-dichloropropionylamino)-benzene-2-sulfonic acid | greenish blue |
| 145 | 2-(3'-Amino-4'-sulfophenylamino)-4-fluoro-6-(β-vinylsulfonylethylamino)-1,3,5-triazine | 1-amino-5-(2,3-dichloropropionylamino)-benzene-2-sulfonic acid | greenish blue |
| 146 | 2-(3'-Amino-4',6'-disulfophenyl- | 1-amino-5-(2,3-di- | greenish |

TABLE 3-continued

| No. | Diazo component | Diazo component | Hue on cotton |
|---|---|---|---|
| | amino)-4-fluoro-6-(β-vinylsulfonyl-ethylamino)-1,3,5-triazine | chloropropionylamino)-benzene-2-sulfonic acid | blue |
| 147 | 2-(4'-Amino-2',5'-disulfophenyl-amino)-4-fluoro-6-(β-vinylsulfonyl-ethylamino)-1,3,5-triazine | 1-amino-5-(2,3-di-chloropropionylamino)-benzene-2-sulfonic acid | greenish blue |
| 148 | 2-(3'-Amino-4',6'-disulfophenyl-amino)-4-fluoro-6-(β-(β-chloro-ethylsulfonyl)-ethylamino)-1,3,5-triazine | 1-amino-5-(2,3-di-chloropropionylamino)-benzene-2-sulfonic acid | greenish blue |
| 149 | 2-(3'-Amino-4'-sulfophenylamino)-4-fluoro-6-(bis-(β-vinylsulfonyl-ethyl)-amino)-1,3,5-triazine | 1-amino-5-(2,3-di-chloropropionylamino)-benzene-2-sulfonic acid | greenish blue |
| 150 | 2-(3'-Amino-4'-sulfophenylamino)-4-chloro-6-(β-vinylsulfonylethyl-amino)-1,3,5-triazine | 1-amino-5-chloroacetyl-amino-benzene-2-sulfonic acid | greenish blue |
| 151 | 2-(3'-Amino-4',6'-disulfophenyl-amino)-4-chloro-6-(β-vinylsulfonyl-ethylamino)-1,3,5-triazine | 1-amino-5-chloroacetyl-amino-benzene-2-sulfonic acid | greenish blue |
| 152 | 2-(4'-Amino-2',5'-disulfophenyl-amino)-4-chloro-6-(β-vinylsulfonyl-ethylamino)-1,3,5-triazine | 1-amino-5-chloroacetyl-amino-benzene-2-sulfonic acid | greenish blue |
| 153 | 2-(3'-Amino-4',6'-disulfophenyl-amino)-4-chloro-6-(β-(β-chloro-ethylsulfonyl)-ethylamino)-1,3,5-triazine | 1-amino-5-chloroacetyl-amino-benzene-2-sulfonic acid | greenish blue |
| 154 | 2-(3'-Amino-4'-sulfophenyl-amino)-4-chloro-6-(bis-(β-vinyl-sulfonylethyl)-amino)-1,3,5-triazine | 1-amino-5-chloroacetyl-amino-benzene-2-sulfonic acid | greenish blue |
| 155 | 2-(3'-Amino-4'-sulfophenylamino)-4-fluoro-6-(β-vinylsulfonylethyl-amino)-1,3,5-triazine | 1-amino-5-chloroacetyl-amino-benzene-2-sulfonic acid | greenish blue |
| 156 | 2-(3'-Amino-4',6'-disulfophenyl-amino)-4-fluoro-6-(β-vinylsulfonyl-ethylamino)-1,3,5-triazine | 1-amino-5-chloroacetyl-amino-benzene-2-sulfonic acid | greenish blue |
| 157 | 2-(4'-Amino-2',5'-disulfophenyl-amino)-4-fluoro-6-(β-vinylsulfonyl-ethylamino)-1,3,5-triazine | 1-amino-5-chloroacetyl-amino-benzene-2-sulfonic acid | greenish blue |
| 158 | 2-(3'-Amino-4',6'-disulfophenyl-amino)-4-fluoro-6-(β-(β-chloro-ethylsulfonyl)-ethylamino)-1,3,5-triazine | 1-amino-5-chloroacetyl-amino-benzene-2-sulfonic acid | greenish blue |
| 159 | 2-(3'-Amino-4'-sulfophenylamino)-4-fluoro-6-(bis-(β-vinylsulfonyl-ethyl)-amino)-1,3,5-triazine | 1-amino-5-chloroacetyl-amino-benzene-2-sulfonic acid | greenish blue |
| 160 | 1-Amino-5-(4-(β-chloroethyl-sulfonyl)-butyrylamino)-benzene-2-sulfonic acid | 2-(3'-amino-4'-sulfophe-nylamino)-4-chloro-6-(β-vinylsulfonylethylamino)-1,3,5-triazine | navy |
| 161 | 1-Amino-5-(4-(β-chloroethyl-sulfonyl)-butyrylamino)-benzene-2-sulfonic acid | 2-(3'-amino-4',6'-disulfo-phenylamino)-4-chloro-6-(β-vinylsulfonylethyl-amino)-1,3,5-triazine | navy |
| 162 | 1-Amino-5-(4-(β-chloroethyl-sulfonyl)-butyrylamino)-benzene-2-sulfonic acid | 2-(4'-amino-2',5'-disul-fophenylamino)-4-chloro-6-(β-vinylsulfonylethyl-amino)-1,3,5-triazine | greenish blue |
| 163 | 1-Amino-5-(4-(β-chloroethyl-sulfonyl)-butyrylamino)-benzene-2-sulfonic acid | 2-(3'-Amino-4',6'-disul-fophenylamino)-4-chloro-6-(β-(β-chloroethylsulfo-nyl)-ethylamino)-1,3,5-triazine | navy |
| 164 | 1-Amino-5-(4-(β-chloroethyl-sulfonyl)-butyrylamino)-ben-zene-2-sulfonic acid | 2-(3'-amino-4'-sulfophenyl-amino)-4-chloro-6-(bis-(β-vinylsulfonylethyl)-amino)-1,3,5-triazine | navy |
| 165 | 1-Amino-5-(4-(β-chloroethyl-sulfonyl)-butyrylamino)-ben-zene-2-sulfonic acid | 2-(3'-amino-4'-sulfophenyl-amino)-4-fluoro-6-(β-vinyl-sulfonylethylamino)-1,3,5-triazine | navy |
| 166 | 1-Amino-5-(4-(β-chloroethyl-sulfonyl)-butyrylamino)-ben-zene-2-sulfonic acid | 2-(3'-amino-4',6'-disulfo-phenylamino)-4-fluoro-6-(β-vinylsulfonylethylamino)-1,3,5-triazine | navy |
| 167 | 1-Amino-5-(4-(β-chloroethyl-sulfonyl)-butyrylamino)-ben-zene-2-sulfonic acid | 2-(4'-amino-2',5'-disulfo-phenylamino)-4-fluoro-6-(β-vinylsulfonylethylamino)-1,3,5-triazine | greenish blue |
| 168 | 1-Amino-5-(4-(β-chloroethyl-sulfonyl)-butyrylamino)-ben- | 2-(3'-amino-4',6'-disulfo-phenylamino)-4-fluoro-6-(β-(β- | navy |

TABLE 3-continued

| No. | Diazo component | Diazo component | Hue on cotton |
|---|---|---|---|
| | zene-2-sulfonic acid | chloroethylsulfonyl)-ethyl-amino)-1,3,5-triazine | |
| 169 | 1-Amino-5-(4-(β-chloroethyl-sulfonyl)-butyrylamino)-benzene-2-sulfonic acid | 2-(3'-amino-4'-sulfophenyl-amino)-4-fluoro-6-(bis-(β-vinylsulfonylethyl)-amino)-1,3,5-triazine | navy |
| 170 | 2-(3'-Amino-4'-sulfophenyl-amino)-4-chloro-6-(β-vinyl-sulfonylethylamino)-1,3,5-triazine | 1-Amino-5-(4-(β-chloroethyl-sulfonyl)-butyrylamino)-benzene-2-sulfonic acid | greenish blue |
| 171 | 2-(3'-Amino-4',6'-disulfo-phenylamino)-4-chloro-6-(β-vinylsulfonylethylamino)-1,3,5-triazine | 1-Amino-5-(4-(β-chloroethyl-sulfonyl)-butyrylamino)-benzene-2-sulfonic acid | greenish blue |
| 172 | 2-(4'-Amino-2',5'-disulfo-phenylamino)-4-chloro-6-(β-vinylsulfonylethylamino)-1,3,5-triazine | 1-Amino-5-(4-(β-chloroethyl-sulfonyl)-butyrylamino)-benzene-2-sulfonic acid | greenish blue |
| 173 | 2-(3'-Amino-4',6'-disulfo-phenylamino)-4-chloro-6-(β-(β-chloroethylsulfonyl)-ethyl-amino)-1,3,5-triazine | 1-Amino-5-(4-(β-chloroethyl-sulfonyl)-butyrylamino)-benzene-2-sulfonic acid | greenish blue |
| 174 | 2-(3'-Amino-4'-sulfophenylamino)-4-chloro-6-(bis-(β-vinylsulfonyl-ethyl)-amino)-1,3,5-triazine | 1-amino-5-(4-(β-chloro-ethylsulfonyl)-butyryl-amino)-benzene-2-sulfonic acid | greenish blue |
| 175 | 2-(3'-Amino-4'-sulfophenylamino)-4-fluoro-6-(β-vinylsulfonylethyl-amino)-1,3,5-triazine | 1-amino-5-(4-(β-chloro-ethylsulfonyl)-butyryl-amino)-benzene-2-sulfonic acid | greenish blue |
| 176 | 2-(3'-Amino-4',6'-disulfophenylamino-4-fluoro-6-(β-vinylsulfonylethyl-amino)-1,3,5-triazine | 1-amino-5-(4-(β-chloro-ethylsulfonyl)-butyryl-amino)-benzene-2-sulfonic acid | greenish blue |
| 177 | 2-(4'-Amino-2',5'-disulfophenyl-amino)-4-fluoro-6-(β-vinylsulfo-nylethylamino)-1,3,5-triazine | 1-amino-5-(4-(β-chloro-ethylsulfonyl)-butyryl-amino)-benzene-2-sulfonic acid | greenish blue |
| 178 | 2-(3'-Amino-4',6'-disulfophenyl-amino)-4-fluoro-6-(β-(β-chloro-ethylsulfonyl)-ethylamino)-1,3,5-triazine | 1-amino-5-(4-(β-chloro-ethylsulfonyl)-butyryl-amino)-benzene-2-sulfo-nic acid | greenish blue |
| 179 | 2-(3'-Amino-4'-sulfophenylamino)-4-fluoro-6-(bis-(β-vinylsulfonyl-ethyl)-amino)-1,3,5-triazine | 1-amino-5-(4-(β-chloro-ethylsulfonyl)-butyryl-amino)-benzene-2-sulfo-nic acid | greenish blue |

EXAMPLE 5

31.9 parts of 1-amino-8-hydroxynaphthalene-4,6-disulfonic acid are dissolved in 100 parts of water under neutral conditions. This solution is added dropwise in the course of 10 minutes to a mixture of 200 parts of ice and water, 18.5 parts of 2,4,6-trichloro-1,3,5-triazine and 10 parts of 37% hydrochloric acid. The reaction mixture is held at pH 1.5 until the condensation has ended by continuously adding 2N sodium hydroxide solution.

This intermediate is coupled at 0° to 10° C. and pH 1.0 with 28.1 parts of diazotised 1-amino-4-(β-sulfatoethyl-sulfonyl)-benzene. After the coupling reaction at pH 6.5 has ended, the reaction solution is brought pH 8.0.

After the addition of 22.9 parts of β-(β-chloroethyl-sulfonyl)-ethylamine hydrochloride, the temperature of the reaction mixture is gradually raised from 5° C. to 20° C., while the reaction mixture is initially held at pH 6.5 and then at pH 8.0 by the continuous addition of 2N sodium hydroxide solution. After the condensation and elimination reaction has ended at pH 10.0 and 20° C., the resulting reactive dye of the formula

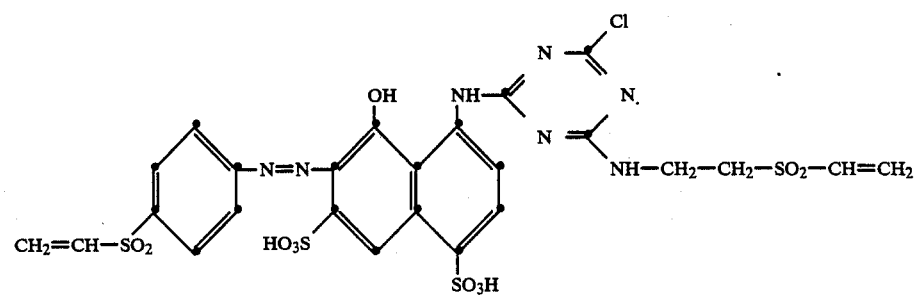

is salted out by sprinkling in potassium chloride at pH 7.0, is filtered off and is dried in vacuo. It dyes cotton in red shades.

Other useful reactive dyes which dye cotton in the hues indicated in column 3 of Table 4 are obtained when 1-amino-8-hydroxynaphthalene-4,6-disulfonic acid in the method of preparation of Example 5 is replaced by one of the intermediates indicated in column 2 of Table 4.

TABLE 4

| No. | Intermediate | Hue on cotton |
|---|---|---|
| 1 | 2-Amino-5-hydroxynaphthalene-7-sulfonic acid | orange |
| 2 | 2-Methylamino-5-hydroxynaphthalene-7-sulfonic acid | orange |
| 3 | 3-Amino-5-hydroxynaphthalene-7-sulfonic acid | red |

EXAMPLE 6

16.0 parts of 1-amino-8-hydroxynaphthalene-4,6-disulfonic acid are dissolved in 400 ml of water under neutral conditions, and the solution is cooled down to 0° to 5° C. 7.1 parts of 2,4,6-trifluoro-1,3,5-triazine are added dropwise at this temperature and pH 4.5 in the course of 15 minutes, during which the pH of the reaction solution is held acid to congo red by the simultaneous addition of 2N sodium hydroxide solution. After the addition of 11.4 parts of $\beta$-($\beta$-chloroethylsulfonyl)-ethylamine hydrochloride, the reaction mixture is initially held briefly at pH 6.0 and then at pH 8.0 by the continuous addition of 2N sodium hydroxide solution while the temperature is raised from 20° to 25° C. in the course of 2 to 3 hours. After the condensation and elimination reaction has ended, this dye intermediate is coupled at 0° to 10° C. and pH 6.0 with 14.1 parts of diazotised 1-amino-(4-($\beta$-sulfatoethylsulfonyl)-benzene. After the coupling reaction has ended at pH 6.5, the reaction mixture is held at pH 9.0 at 20° C. by the continuous addition of 2N sodium hydroxide solution until the complete elimination is indicated by chromatography. Thereafter the reaction mixture is clarified at pH 6.5 and the synthesised reactive dye of the formula

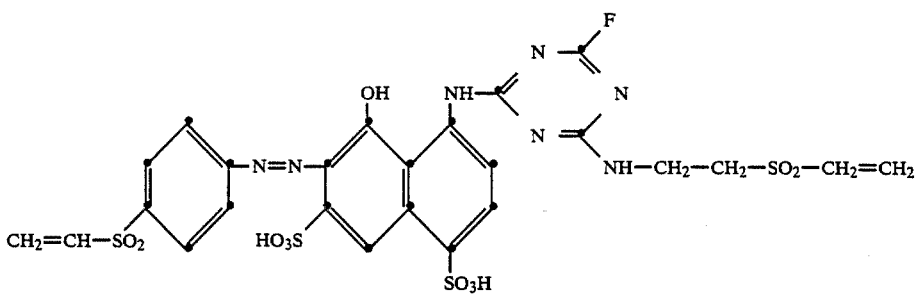

is salted out by sprinkling in sodium chloride, is filtered off and is dried in vacuo. It dyes cotton in red shades.

Other useful reactive dyes which dye cotton in the hues indicated in column 3 of Table 5 are obtained when 1-amino-8-hydroxynaphthalene-4,6-disulfonic acid in the method of preparation of Example 6 is replaced by one of the intermediates indicated in column 2 of Table 5.

TABLE 5

| No. | Intermediate | Hue on cotton |
|---|---|---|
| 1 | 2-Amino-5-hydroxynaphthalene-7-sulfonic acid | orange |
| 2 | 2-Methylamino-5-hydroxynaphthalene-7-sulfonic acid | orange |
| 3 | 3-Amino-5-hydroxynaphthalene-7-sulfonic acid | red |

DYEING METHOD I 2 parts of the dye obtained in Example 1 are dissolved in 400 parts of water; to this solution are added 1,500 parts of a solution which contains per liter 53 g of sodium chloride. 100 parts of a cotton fabric are introduced at 40° C. into this dyebath. After 45 minutes 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

DYEING METHOD II 2 parts of the reactive dye obtained in Example 1 are dissolved in 400 parts of water; to this solution are added 1,500 parts of a solution which contains per liter 53 g of sodium chloride. 100 parts of a cotton fabric are introduced at 35° C. into this dyebath. After 20 minutes 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

DYEING METHOD III 8 parts of the reactive dye obtained in Example 1 are dissolved in 400 parts of water; to this solution are added 1,400 parts of a solution which contains per liter 100 g of sodium sulfate. 100 parts of a cotton fabric are introduced at 25° C. into this dyebath. After 10 minutes 200 parts of a solution which contains per liter 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

DYEING METHOD IV 4 parts of the reactive dye obtained in Example 1 are dissolved in 50 parts of water; to this solution are added 50 parts of a solution which contains per liter 5 g of sodium hydroxide and 20 g of calcined sodium carbonate. The resulting solution is applied to a cotton fabric on a pad-mangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quarter of an hour, is rinsed once more and is dried.

DYEING METHOD V 6 parts of the reactive dye obtained in Example 1 are dissolved in 50 parts of water; to this solution are added 50 parts of a solution which contains per liter 16 g of sodium hydroxide and 0.04 liter of 38° Be sodium silicate. The resulting solution is applied to a cotton fabric on a pad-mangle in such a way that its weight increases by 70%, and the fabric is then wound onto a beam. In this state the cotton fabric is left at room temperature for 10 hours. The dyed fabric is then rinsed, is soaped off at the boil with a nonionic detergent for a quarter of an hour, is rinsed once more and is dried.

DYEING METHOD VI 2 parts of the reactive dye obtained in Example 1 are dissolved in 100 parts of water in the presence of 0.5 part of sodium m-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 g of sodium hydroxide and 300 g of sodium chloride, and is squeezed to a 75% weight increase and the dyeing is steamed at 100° to 102° C. for 30 seconds, is rinsed, is soaped off at the boil with a 0.3% strength solution of a nonionic detergent for a quarter of an hour, is rinsed and is dried.

PRINTING METHOD I 3 parts of the reactive dye obtained in Example 1 are sprinkled with high-speed stirring into 100 parts of stock thickening containing 50 parts of 5% strength sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric, which is then dried, and the resulting printed fabric is steamed at 102° C. in saturated steam for 2 minutes. The printed fabric is then rinsed, if desired soaped off at the boil and rinsed once more, and is then dried.

PRINTING METHOD II 5 parts of the reactive dye obtained in Example 1 are sprinkled with high-speed stirring into 100 parts of a stock thickening containing 50 parts of 5% strength sodium alginate thickening, 36.5 parts of water, 10 parts of urea, 1 part of sodium m-nitrobenzenesulfonate and 2.5 parts of sodium hydrogencarbonate. The print paste thus obtained, whose stability meets industrial requirements, is used to print a cotton fabric, which is then dried, and the resulting printed fabric is steamed at 102° C. in saturated steam for 8 minutes. The printed fabric is then rinsed, if desired soaped off at the boil and rinsed once more, and is then dried.

I claim:

1. A reactive dye of the formula

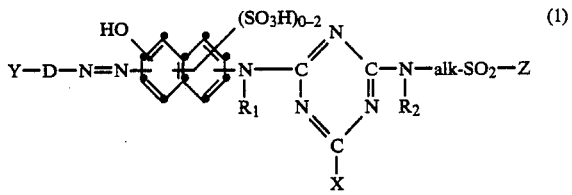

or of the formula

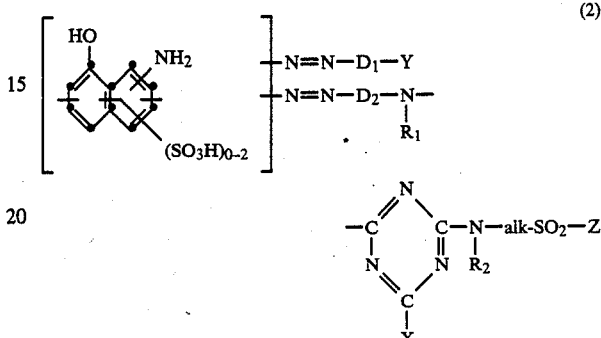

in which D, $D_1$ and $D_2$ are each phenylene or naphthylene unsubstituted or substituted by alkyl having 1 to 4 carbon atoms, alkoxy having 1 to 4 carbon atoms, carboxylic acylamino having 1 to 8 carbon atoms, amino, alkylamino having 1 to 4 carbon atoms, phenylamino, N,N-di-$\beta$-hydroxyethylamino, N,N-di-$\beta$-sulfatoethylamino, sulfobenzylamino, N,N-disulfobenzylamino, alkoxycarbonyl having 1 to 4 carbon atoms in the alkoxy radical, alkylsulfonyl having 1 to 4 carbon atoms, trifluoromethyl, nitro, cyano, halogen, carbamoyl, N-alkylcarbamoyl having 1 to 4 carbon atoms in the alkyl radical, sulfamoyl, N-alkylsulfamoyl having 1 to 4 carbon atoms, N-($\beta$-hydroxyethyl)-sulfamoyl, N,N-di-($\beta$-hydroxyethyl)-sulfamoyl, N-phenylsulfamoyl, ureido, hydroxyl, carboxyl, sulfomethyl, or sulfo, $R_1$ is hydrogen or $C_{1-4}$-alkyl unsubstituted or substituted by halogen, hydroxyl, cyano, $C_{1-4}$-alkoxy, methoxycarbonyl, ethoxycarbonyl, sulfamoyl, sulfato, carboxyl or sulfo, $R_2$ is (1) hydrogen, (2) alkyl unsubstituted or substituted by halogen, hydroxyl, cyano, alkoxy, methoxycarbonyl, ethoxycarbonyl, sulfamoyl, sulfato, carboxyl or sulfo, (3) cyclohexyl, (4) phenyl unsubstituted or substituted by methyl, ethyl, methoxy, ethoxy, chlorine, bromine, carboxyl, sulfo or sulfomethyl, or (5) a radical of the formula —alk—$SO_2$—Z, wherein alk is $C_{2-6}$-alkylene, Y is —$SO_2$—Z, —$SO_2$—N($R_1$)—Z, —N—($R_1$)—$SO_2$—Z,

—N($R_1$)—CO—($CH_2$)$_{1-5}$$SO_2$—Z,

—$SO_2$—F, —$SO_2CH_2$—CH=$CH_2$, —N($R_1$)—CO—CBr=$CH_2$, —N($R_1$)—CO—CHBr—$CH_2$Br, —N($R_1$)—CO—CCl=$CH_2$, —N($R_1$)—CO—CHCl—$CH_2$Cl, —N($R_1$)—CO—$CH_2$Cl or —N($R_1$)—CO—CH=$CH_2$, Z is —CH=$CH_2$ or —$CH_2CH_2$—A, A is —$OSO_3H$, —$SSO_3H$, —$OCOCH_3$, —$OPO_3H_2$, —Cl, —Br or —F, and X is fluorine, chlorine or hydroxyl.

2. A reactive dye according to claim 1, of the formula

—CH₂CH₂—A, A is sulfato, acetoxy, chlorine, phosphato or thiosulfato, and X is fluorine, chlorine or hydroxyl.

4. A reactive dye according to claim 1 of the formula

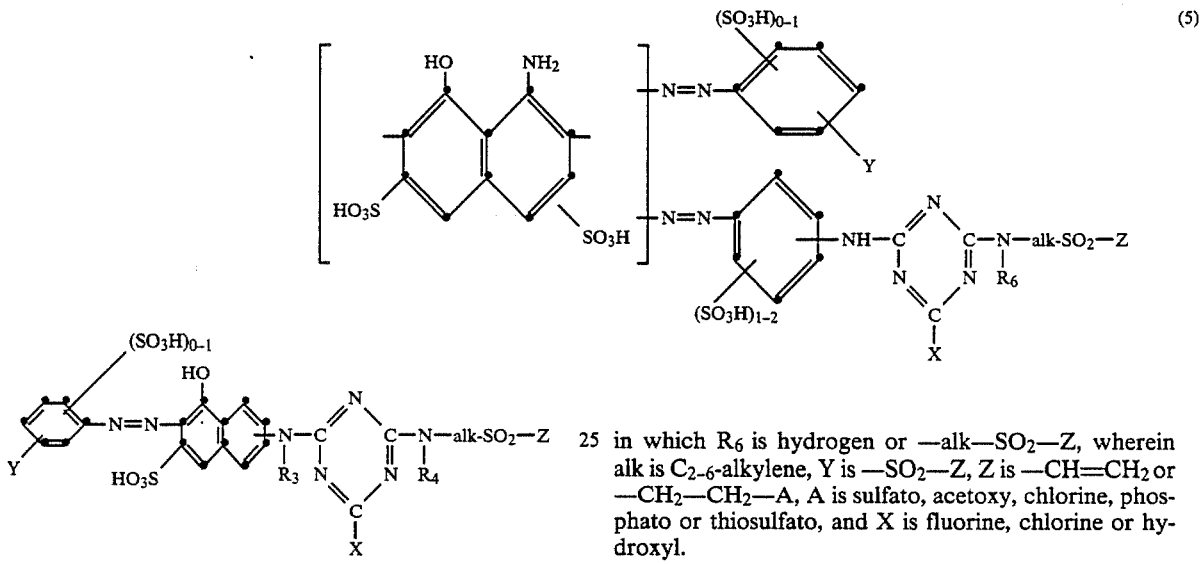

in which $R_3$ is hydrogen, methyl or ethyl, $R_4$ is hydrogen or —alk—SO₂—Z, wherein alk is $C_{2-6}$-alkylene, Y is —SO₂—Z, Z is —CH=CH₂ or —CH₂CH₂—A, A is sulfato, acetoxy, chlorine, phosphato or thiosulfato, and X is fluorine, chlorine or hydroxyl.

3. A reactive dye according to claim 1, of the formula

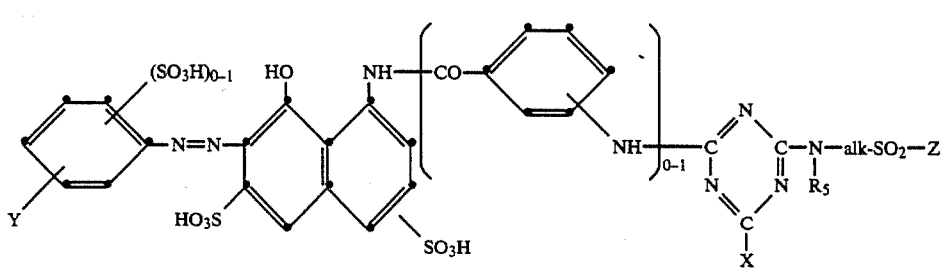

in which $R_5$ is hydrogen or —alk—SO₂—Z, wherein alk is $C_{2-6}$-alkylene, Y is —SO₂—Z, Z is —CH=CH₂ or —CH₂—CH₂—A, A is sulfato, acetoxy, chlorine, phosphato or thiosulfato, and X is fluorine, chlorine or hydroxyl.

5. A reactive dye according to claim 4 of the formula

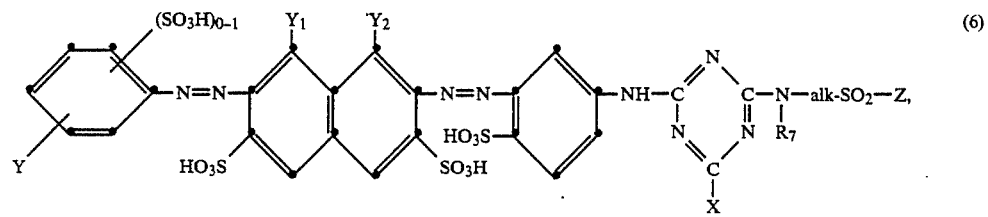

in which $R_6$ is hydrogen or —alk—SO₂—Z, wherein alk is $C_{2-6}$-alkylene, Y is —SO₂—Z, Z is —CH=CH₂ or —CH₂—CH₂—A, A is sulfato, acetoxy, chlorine, phosphato or thiosulfato, and X is fluorine, chlorine or hydroxyl.

in which $R_7$ is hydrogen or —alk—SO₂—Z, wherein alk is $C_{2-6}$-alkylene, Y is —NH—CO—CHBr—CH₂—Br, —NH—CO—CBr=CH₂ or —SO₂—Z, Z is —CH=CH₂ or —CH₂—CH₂—A, A is sulfato, acetoxy, chlorine, phosphato or thiosulfato, X is fluorine, chlorine or hydroxyl, and one V is OH the other V is NH₂.

6. The reactive dye according to claim 3, of the formula

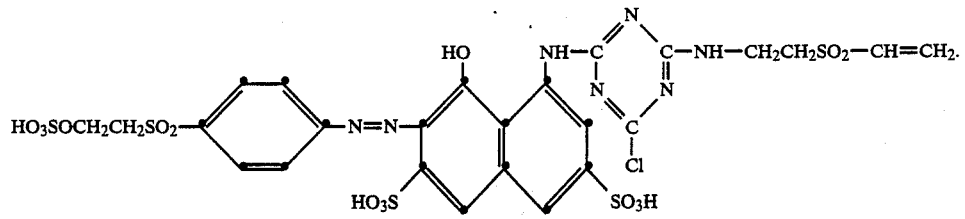
(7)
7. The reactive dye according to claim 3, of the formula
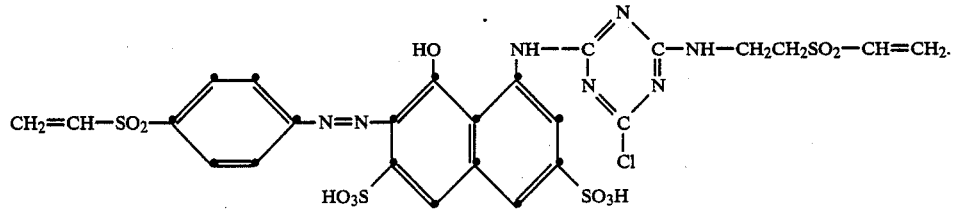
(7a)
8. The reactive dye according to claim 3, of the formula
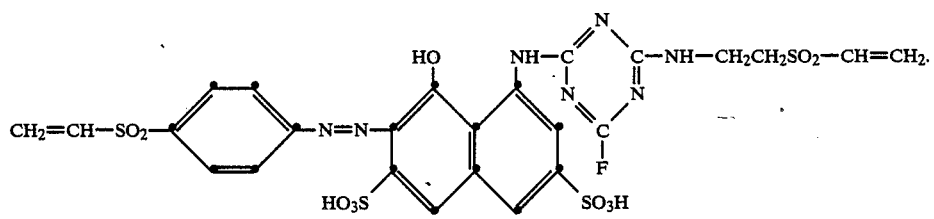
(8)
9. The reactive dye according to claim 5, of the formula
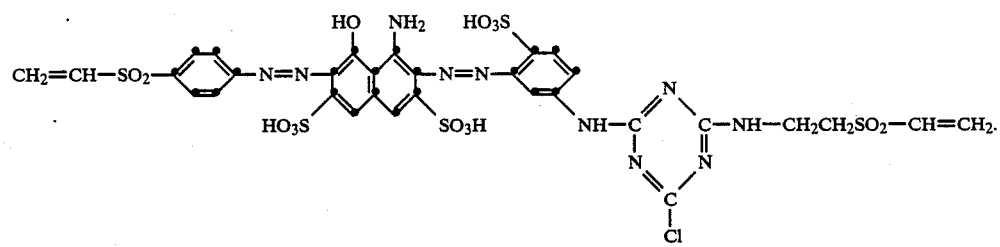
(9)
10. The reactive dye according to claim 5, of the formula
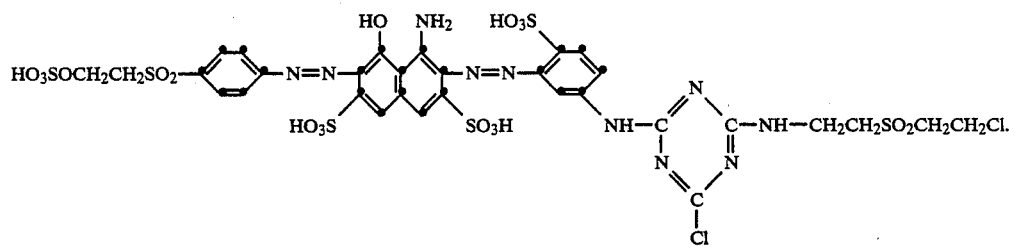
(9a)
* * * * *